United States Patent [19]
Anderson et al.

[11] Patent Number: 5,964,867
[45] Date of Patent: *Oct. 12, 1999

[54] METHOD FOR INSERTING MEMORY PREFETCH OPERATIONS BASED ON MEASURED LATENCIES IN A PROGRAM OPTIMIZER

[75] Inventors: Jennifer-Ann M. Anderson, Palo Alto; Jeffrey Dean, Menlo Park, both of Calif.; James E. Hicks, Newton, Mass.; Carl A. Waldspurger, Atherton; William E. Weihl, San Francisco, both of Calif.

[73] Assignee: Digital Equipment Corporation, Maynard, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/980,145

[22] Filed: Nov. 26, 1997

[51] Int. Cl.⁶ .................................................. G06F 9/38
[52] U.S. Cl. ....................... 712/219; 712/207; 712/216
[58] Field of Search ........................... 395/395, 383, 395/392; 712/219, 207, 216

[56] References Cited

U.S. PATENT DOCUMENTS

| | | | |
|---|---|---|---|
| 4,590,550 | 5/1986 | Eilert et al. | 395/183.21 |
| 4,821,178 | 4/1989 | Levin et al. | 395/184.01 |
| 4,845,615 | 7/1989 | Blasciak | 395/182.08 |
| 5,103,394 | 4/1992 | Blasciak | 395/184.01 |
| 5,151,981 | 9/1992 | Westcott et al. | 395/185.03 |
| 5,446,876 | 8/1995 | Levine et al. | 395/184.01 |
| 5,450,586 | 9/1995 | Kuzara et al. | 395/704 |
| 5,475,823 | 12/1995 | Amerson et al. | 395/496 |
| 5,479,652 | 12/1995 | Dreyer et al. | 395/183.06 |
| 5,485,574 | 1/1996 | Bolosky et al. | 395/183.11 |
| 5,493,673 | 2/1996 | Rindos et al. | 395/557 |
| 5,524,263 | 6/1996 | Griffith et al. | 395/800.23 |
| 5,528,753 | 6/1996 | Fortin | 395/183.11 |
| 5,537,541 | 7/1996 | Wibecan | 395/183.21 |
| 5,572,672 | 11/1996 | Dewitt et al. | 395/184.01 |
| 5,581,482 | 12/1996 | Weidenman et al. | 702/186 |
| 5,651,112 | 7/1997 | Matsuno et al. | 395/184.01 |
| 5,704,053 | 12/1997 | Santhanam | 395/383 |
| 5,710,912 | 1/1998 | Schlansker et al. | 395/561 |
| 5,715,425 | 2/1998 | Goldman et al. | 395/445 |
| 5,734,856 | 3/1998 | Wang | 395/395 |
| 5,761,468 | 6/1998 | Emberson | 395/383 |

OTHER PUBLICATIONS

Abraham et al., Predicting Load Latencies Using Cache Profiling, HPL–94–110, Nov. 1994, copyright Hewlett–Packard Co.

Anderson et al., Continuous Profiling: Where Have all the Cycles Gone? To be published in The Proceedings of the 16th ACM Symposium on Operating Systems Principles, copyright 1997 by the Assoc. for Computing Machinery.

Ball et al., Efficient Path Profiling, Published in Proceedings of MICRO–29, Dec. 2–4, 1996, in Paris, France, pp. 46–57. Copyright 1996 IEEE.

Bershad et al., Avoiding Conflict Misses Dynamically in Large Direct–Mapped Caches, Proceedings of the 6th International Conference on Architectural Support for Programming Languages and Operating Systems, pp. 158–170, Oct. 4–7, 1994.

(List continued on next page.)

Primary Examiner—Krisna Lim

[57] ABSTRACT

A method is provided for optimizing a program by inserting memory prefetch operations in the program executing in a computer system. The computer system includes a processor and a memory. Latencies of instructions of the program are measured by hardware while the instructions are processed by a pipeline of the processor. Memory prefetch instructions are automatically inserted in the program based on the measured latencies to optimize execution of the program. The latencies measure the time from when a load instructions issues a request for data to the memory until the data are available in the processor. A program optimizer uses the measured latencies to estimate the number of cycles that elapse before data of a memory operation are available.

7 Claims, 21 Drawing Sheets

OTHER PUBLICATIONS

Cohn et al., Hot Cold Optimization of Large Windows/NT Applications, Proceedings of the $29^{th}$ Annual International Symposium on Microarchitecture, pp. 80–89, Dec. 1996. Copyright 1996 IEEE.

Conte et al., Using Branch Handling Hardware to Support Profile–Driven Optimization, Proceedings of the 1994 $27^{th}$ Annual International Symposium on Microarchitecture, Nov. 30–Dec. 2, 1994, San Jose, Calif.

Conte et al., Accurate and Practical Profile–Driven Compilation Using the Profile Buffer, Proceedings of the $29^{th}$ Annual International Symposium on Microarchitecture, pp. 36–45, Dec. 2–4, 1996.

Fisher, J.A., Global Code Generation for Instruction–Level Parallelism: Trace Scheduling–2, Hewlett–Packard Technical Report No. HPL–93–43, Jun., 1993. To be published by Springer–Verlag, London, UK.

Horowitz et al., Informing Memory Operations: Providing Memory Performance Feedback in Modern Processors, Proceedings of the $23^{rd}$ Annual International Symposium on Computer Architecture, pp. 260–270, May 22–24, 1996.

Hwu et al., The Superblock: An Effective Technique for VLIW and Superscalar Compilation, Center for Reliable and High–Performance Computing, Univ. of Illinois, Urbana–Champaign, Illinois, 61801.

Romer et al., Dynamic Page Mapping Policies for Cache Conflict Resolution on Standard Hardware, Proceedings of the First Symposium for Operating Systems Design and Implementation, pp. 255–266, 1994.

Romer et al., Reducing TLB and Memory Overhead Using Online Superpage Promotion, Proceedings of the $22^{nd}$ Annual International Symposium on Computer Architecture, pp. 176–187, Jun. 1995.

Tullsen et al., Exploiting Choice: Instruction Fetch and Issue on an Implementable Simultaneous Multithreading Processor, Proceedings of the $23^{rd}$ Annual International Symposium on Computer Architecture, Philadelphia, PA, May, 1996.

Tullsen et al., Simultaneous Multithreading: Maximizing On–Chip Parallelism, Proceedings of the $22^{nd}$ Annual International Symposium on Computer Architecture, Santa Margherita Ligure, Italy, Jun. 1995.

Verghese et al., Operating System Support for Improving Data Locality on CC–NUMA Compute Servers, Proceedings of the $7^{th}$ International Conference on Architectural Support for Programming Languages and Operating Systems, pp. 279–289, Oct. 1–5, 1996.

Young et al., Improving the Accuracy of Static Branch Prediction Using Branch Correlation, Proceedings of the $6^{th}$ International Conference on Architectural Support for Programming Languages and Operating Systems, pp. 232–241, Oct. 4–7, 1994.

METHOD FOR INSERTING MEMORY PREFETCH OPERATIONS BASED ON MEASURED LATENCIES IN A PROGRAM OPTIMIZER

FIELD OF THE INVENTION

The present invention relates generally optimizing programs, and more particularly to inserting prefetch instructions.

BACKGROUND OF THE INVENTION

Computer processors are getting faster, yet software application performance is not keeping pace. For large commercial applications, average processor cycles-per-instruction (CPI) values may be as high as 2.5 or 3. With a four-way instruction issue processor, a CPI of three means that only one issue slot in every twelve is being put to good use. It is important to understand why software throughput is not keeping up with hardware improvements.

It is common to blame such problems on memory latencies, in fact, many software applications spend many cycles waiting for data transfers to complete. However, other problems, such as branch mispredicts also waste processor cycles. Independent of the general causes, system architects, and hardware and software engineers need to know which instructions are stalling and why in order to improve the performance of modern computer systems incorporating complex processors.

Typically, this is done by generating a "profile" of the behavior of a system while it is operating. A profile is a record of performance data. Frequently, the profile is presented graphically so that performance bottlenecks can readily be identified.

Profiling can be done by instrumentation and simulation. With instrumentation, additional code is added to a program to monitor specific events during execution of a program. Simulation attempts to emulate the behavior of the entire program in an artificial environment rather than executing the program in the real system.

Each of these two methods has its drawbacks. Instrumentation perturbs the program's true behavior due to the added instructions and extra data references. Simulation avoids perturbation at the expense of a substantial performance overhead when compared to executing the program on a real system. Furthermore, with either instrumentation or simulation, it is usually difficult to profile an entire large scale software system, i.e., application, operating system, and device driver code.

Hardware implemented event sampling can also be used to provide profile information of processors. Hardware sampling has a number of advantages over simulation and instrumentation: it does not require modifying software programs to measure their performance. Sampling works on complete systems, with a relatively low overhead. Indeed, recently it has been shown that low-overhead sampling-based profiling can be used to acquire detailed instruction-level information about pipeline stalls and their causes. However, many hardware sampling techniques lack flexibility because they are designed to measure specific events.

Most extant microprocessors, such as the DIGITAL Alpha AXP 21164, the Intel Pentium Pro, and the MIPS R10000 provide event counters that can count a variety of events, such as data cache (D-cache) misses, instruction cache (I-cache) misses, and branch mispredicts. The event counters generate an interrupt when the counters overflow so that the performance data in the counters can be sampled by higher levels of software.

Event counters are useful for capturing aggregate information, such as the number of branch mispredicts that the system incurred while executing a particular program, or part thereof. However, known event counters are less useful for attributing state information to individual instructions, such as which branch instructions are frequently mispredicted. This may be due to the fact that the program counters (PC) of instructions that caused the events may no longer be available when the event counter overflows and interrupts.

It is a particular problem to deduce the dynamic operation of a processor that can issue instructions out-of-order. Indeed, the behavior of software programs executing in an out-of-order processor can be quite subtle and difficult to understand. Consider the flow of instructions in the out-of order Alpha 21264 processor as a concrete example.

Superscalar Processor Architecture
Execution Order

An out-of-order processor fetches and retires instructions in order, but processes the instructions according to their data dependencies. Processing instructions can involve register mapping, instruction issuing and executing. An instruction is said to be "in-flight" from the time it is fetched until it retires or aborts.

During each processor cycle, a first stage of the processor pipeline fetches a set of instructions from the instruction cache (I-cache). The set of instructions are decoded. The instruction decoder identifies which instructions in the fetched set are part of the instruction stream.

Because it may take multiple cycles to resolve the PC of a next instruction to fetch, the PC is usually predicted ahead of time by a branch or jump predictor. When the prediction is incorrect, the processor will abort the mispredicted instructions which occupy a "bad" execution path, and will restart fetching instructions on the "good" path.

To allow instructions to execute out-of-order, registers specified in operands of instructions are dynamically renamed to prevent write-after-read and write-after-write conflicts. This renaming is accomplished by mapping architectural or "virtual" registers to physical registers. Thus, two instructions that write the same virtual register can safely execute out-of-order because they will write to different physical registers, and consumers of the virtual registers will get the proper values.

A register mapped instruction resides in the issue queue until its operands have been computed and a functional "execution" unit of the appropriate type is available. The physical registers used by an instruction are read in the cycle that the instruction issues. After instructions have executed, they are marked as ready to retire and will be retired by the processor when all previous ready-to-retire instructions in program order have been retired, i.e., instructions retire in the correct program order. Upon retirement, the processor commits the changes made by the instruction to the architectural "state" of the system, and releases resources consumed by the instruction.

Misprediction

In some cases, such as when a branch is mispredicted, instructions must be trapped or discarded. When this occurs, the current speculative architectural state is rolled back to a point in the execution where the misprediction occurred, and fetching continues at the correct instruction.

Delays

Numerous events may delay the execution of an instruction. At the front of the pipeline, the fetch unit may stall due to an I-cache miss, or the fetch unit may fetch instructions along a bad path due to a misprediction. The mapper may stall due to lack of free physical registers, or lack of free slots in the issue queue. Instructions in the issue queue may wait for their register dependencies to be satisfied, or for the availability of functional execution units.

Instructions may stall due to data cache misses. Instructions may trap because they were speculatively issued down a bad path, or because the processor took an interrupt. Many of these events are difficult to predict statically, e.g, by an examination of the code, and all of them degrade the performance of the system. Simple event counters are inadequate to capture this type of state information. In addition, it is difficult to exactly measure the lengths of the delays to determine which delays deserve special attention.

It is highly desirable to directly attribute events to specific instructions and machine states so that programmers, or optimization tools can improve the performance of software and hardware components of complex computer systems such as super-scalar and out-of-order processors, or for that matter processors of any architectural design.

Problems with Prior Art Event Counters

The main problem with known event counters is that the instruction that caused the event that overflowed the counter was usually fetched long before the exception PC, i.e., the PC is not of the instruction that caused the overflow. The length of the delay between the fetch and interrupt is generally an unpredictable amount. This unpredictable distribution of events makes it difficult to properly attribute events to specific instructions. Out-of-order and speculative execution amplifies this problem, but it is present even on in-order machines such as the Alpha 21164 processor.

For example, compare program counter values delivered to the performance counter interrupt handler while monitoring D-cache reference-event counts for the Alpha 21164 (in-order) processor vs. the Pentium Pro (out-of-order) processor. An example program consists of a loop containing a random memory access instruction, for example a load instruction, followed by hundreds of null operation instructions (nop).

On the in-order Alpha processor, all performance counter events (for example, cache misses) are attributed to the instruction that is executing six cycles after the event to result in a large peak of samples on the seventh instruction after the load access. This skewed distribution of events is not ideal. However, because there exists a single large peak, static analysis can sometimes work backwards from this peak to identify the actual instruction that caused the event, but this is still only nothing more than a best guess for a fairly simple program.

For the identical program executing on the out-of-order Pentium Pro, the event samples are widely distributed over the next 25 instructions, illustrating not only skewing but significant smearing as well. The wide distribution of samples makes it nearly impossible to attribute a specific event to the particular instruction that caused the event. Similar behavior occurs when counting other hardware events.

In addition to the skewed or smeared distribution of event samples, traditional event counters also suffer from additional problems. There usually are many more events of interest than there are event counters, making it difficult, if not impossible to concurrently monitor all interesting events. The increasing complexity of processors is likely to exacerbate this problem.

In addition, event counters only record the fact that an event occurred; they do not provide any additional state information about the event. For many kinds of events, additional information, such as the latency to service a cache miss event, would be extremely useful.

Furthermore, prior art counters generally are unable to attribute events to "blind spots" in the code. A blind spot is any non-interruptible code, such as high-priority system routines and PAL code, because the event will not be recognized until its interrupt is honored. By that time, the processor state may have changed significantly, most likely giving false information.

Stalls vs. Bottlenecks

On a pipelined, in-order processor, one instruction stalling in a pipeline stage prevents later instructions from passing through that pipeline stage. Therefore it is relatively easy to identify "bottleneck" instructions on an in-order processor, that is bottleneck instructions tend to stall somewhere in the pipeline. For an in-order processor, it is possible to identify stalls by measuring the latency of an instruction as it passes through each pipeline stage, and comparing the measured latency to the ideal latency of that instruction in each pipeline stage. An instruction can be presumed to have stalled in a stage when it takes longer than the minimum latency to pass through that stage.

However, on an out-of-order processor, other instructions may pass through a pipeline stage around an instruction that is stalled in that pipeline stage. In fact, the additional latency of the stalled instruction may be completely masked by the processing of other instructions, and, in fact, stalled instructions may not delay the observed completion of the program.

Even on in-order processors, stalls in one pipeline stage may not contribute to the overall execution time of a program when another pipeline stage is the bottleneck. For example, during the execution of a memory intensive program, the fetcher and mapper of the instruction pipeline may often stall because of "back-pressure" from an execution unit delayed by D-cache misses.

Ideally, one would like to classify the memory operations causing the cache misses as the primary bottlenecks. The fetcher and mapper stalls are actually asymptomatic of the delays due to cache misses, that is, secondary bottlenecks.

It would be desired to identify those instructions whose stalls are not masked by other instructions, and to identify them as true bottlenecks. Furthermore, in order to improve program behavior, there is a need to focus on the causal (primary) bottlenecks rather than the symptomatic (secondary) bottlenecks. This classification of pipeline stage bottlenecks as causal and asymptomatic requires detailed knowledge of the state of the pipeline and the data and resource dependencies of the in-flight instructions which cannot be obtained from simple event counters as are known.

U.S. Pat. No. 5,151,981 "Instruction Sampling Instrumentation," issued to Wescott et al. on Sep. 29, 1992 proposes a hardware mechanism for instruction-based sampling in an out-of-order execution machine. There are a number of drawbacks in the approach taken by Wescott et al. First, their approach can bias the stream of instruction samples depending on the length of the code being sampled and the sampling rate. Second, their system only samples retired instructions, and not all instructions fetched, some of which may be aborted. Third, the information collected by the Wescott et al. mechanism focuses on individual event attributes, e.g., cache misses, but does not provide useful information for determining inter-instruction relationships.

More recently, a hardware mechanism called "informing loads" has been proposed, please see, Horowitz et al, "Informed memory operations: Providing memory performance feedback in modern processors," Proceedings 23rd Annual International Symposium on Computer Architecture, pp. 260–270, May 22, 1996. There, a memory operation can be followed by a conditional branch operation that is taken if and only if the memory operation misses in the cache. Although not specifically designed for profiling, that mechanism could be used to specifically gather just D-cache missed event information.

In other specialized hardware, called a cache miss look-aside (CML) buffer, virtual memory pages that suffer from a high level-2 cache miss rate are identified, see Bershad et al. "Avoiding conflict misses dynamically in large direct-mapped caches," Proceedings of the Sixth International Conference on Architectural Support for Programming Languages and Operating Systems, pp. 158–170, Oct. 4, 1994, for a full description.

Some processors, such as the Intel Pentium, permit software to read the contents of the branch predictor's branch target buffer (BTB). By periodically reading the BTB in software, Conte et al. developed a very low overhead technique to estimate edge execution frequencies of a program, see "Using branch handling hardware to support profile-driven optimization," Proceedings of the 27th Annual International Symposium on Microarchitecture, pp. 12–21, Nov. 30, 1994.

That approach yields information that is similar to that which could be obtained by keeping track of the branch direction information contained in a "profile record" storing related sampling information. More recently, Conte et al. proposed a piece of additional hardware called a profile buffer which counts the number of times a branch is taken and not-taken, see "Accurate and practical profile-driven compilation using the profile buffer," Proceedings of the 29th Annual International Symposium on Microarchitecture, pp. 36–45, Dec. 2, 1996.

SUMMARY OF THE INVENTION

Provided is an apparatus and method for measuring the operation of processors which depart from traditional mechanisms. Rather than counting events, and sampling the program counter when event counters overflow, the present apparatus and method relies on randomly selecting instructions, and sampling detailed state information for the selected instructions.

Periodically, during operation of a processor, an instruction to be profiled is randomly selected, and a profile record of what happens during the execution of the instruction is accumulated in a set of internal profile registers of the processor. After processing of the selected instruction terminates, e.g., the instruction retires, aborts, or traps, an interrupt is generated. The recorded information characterizing the details of how the instruction was processed in the pipeline can be sampled from the internal profile registers by software.

The profile registers can record many useful facts about an instruction's execution. Example performance information can include: the number of cycles the selected instruction spent in each stage of an execution pipeline, i.e., stage latencies, whether the instruction suffered I-cache or D-cache misses, the effective addresses of its memory operands, or branch/jump targets, and whether the instruction was retired or aborted.

On in-order executing processors, it is possible to estimate the total number of stall cycles attributable to each instruction when one is given the fetch-to-retire latencies of sampled instructions. This is sufficient to identify bottlenecks because one stalled instruction cannot overlap with another stalled instruction.

On an out-of-order processor, most stalls are likely to overlap and be masked by other instructions issued out-of-order around the stalled instructions. This makes the identification of stalled instructions difficult. In addition, it may be necessary to collect information about the average level of concurrency while each instruction was executing in order to identify bottlenecks.

Special-purpose hardware could count and record the number of instructions that issue while a profiled instruction is executing to measure the level of concurrent execution. However, this fails to account for instructions that issue but are aborted, and therefore fail to retire. Provided here is a measurement of the amount of useful concurrency. The useful concurrency being the average number of instructions that issue in parallel and successfully retire with a given instruction. Instructions that issue but subsequently abort are not useful. Then, instructions whose stalls are not masked by useful concurrency can be classified as bottlenecks. To state this another way, a key metric for pinpointing performance bottlenecks on an out-of-order processor is the number of issue slots that are wasted while a given instruction executes.

Accordingly, in order to measure useful concurrency, a technique called "pair-wise sampling" is provided. The basic idea is to implement a nested form of sampling. Here, a window of instructions that may execute concurrently with a first profiled instruction is dynamically defined. A second instruction is randomly selected for profiling from the window of instructions. The profiled and second instruction form a sample pair for which profile information can be collected.

Pair-wise sampling facilitates the determination of the number of wasted issue slots attributable to each instruction, and pinpoints bottlenecks much more accurately than known techniques. In general, pair-wise sampling is very flexible, forming the basis for analysis that can determine a wide variety of interesting concurrency and utilization metrics.

Specifically, provided is an apparatus and method for periodically, and randomly selecting one or more instructions processed by a pipeline of a processor, and to collect profile information while the instruction progresses through stages of an execution pipeline. Higher-level software can then post-process this information in a variety of ways, such as by aggregating information from multiple executions of the same instruction.

Examples of information that can be captured include: the instruction's address (program counter or PC), whether the instruction suffered an instruction cache miss and the latency incurred to service the miss. If the instruction performs a memory operation, determine whether the instruction suffered a data-cache miss and measure the latency for satisfying the memory request. Furthermore, the amount of time the instruction spend in each pipeline stage can be measured. The profile information can also indicate whether the instruction retired or aborted, and in the later case what kind of trap caused execution of the instruction to be aborted.

The information is collected in a set of profiling registers as the instruction progresses through the execution pipeline. When an instruction finishes executing, either because it retires or because it aborts, an interrupt is delivered to higher level software. The software can then process the information present in the profiling registers in a variety of ways.

Although the sampled performance information is very useful for profile-directed optimization, there are also many uses for hardware event-counters, such as counting the aggregate number of occurrences of an event.

The disclosed technique is an improvement over existing performance-monitoring hardware, and can be efficiently implemented at a relatively low hardware cost in modern microprocessors that can issue instructions out-of-order.

More particularly, a method is provided for optimizing a program by inserting memory prefetch operations in the program executing in a computer system. The computer system includes a processor and a memory.

Latencies of instructions of the program are measured by hardware while the instructions are processed by a pipeline of the processor. Memory prefetch instructions are automatically inserted in the program based on the measured latencies to optimize execution of the program.

The latencies measure the time from when a load instructions issues a request for data to the memory until the data are available in the processor. A program optimizer uses the measure latencies to estimate the number of cycles that elapse before data of a memory operation are available.

BRIEF DESCRIPTION OF THE DRAWINGS

FIG. 8b is a diagram showing fetch distances between instructions;

FIG. 8c is a diagram showing temporal overlap measured in cycles;

DETAILED DESCRIPTION OF THE PREFERRED EMBODIMENT

System Overview

Figure 1:
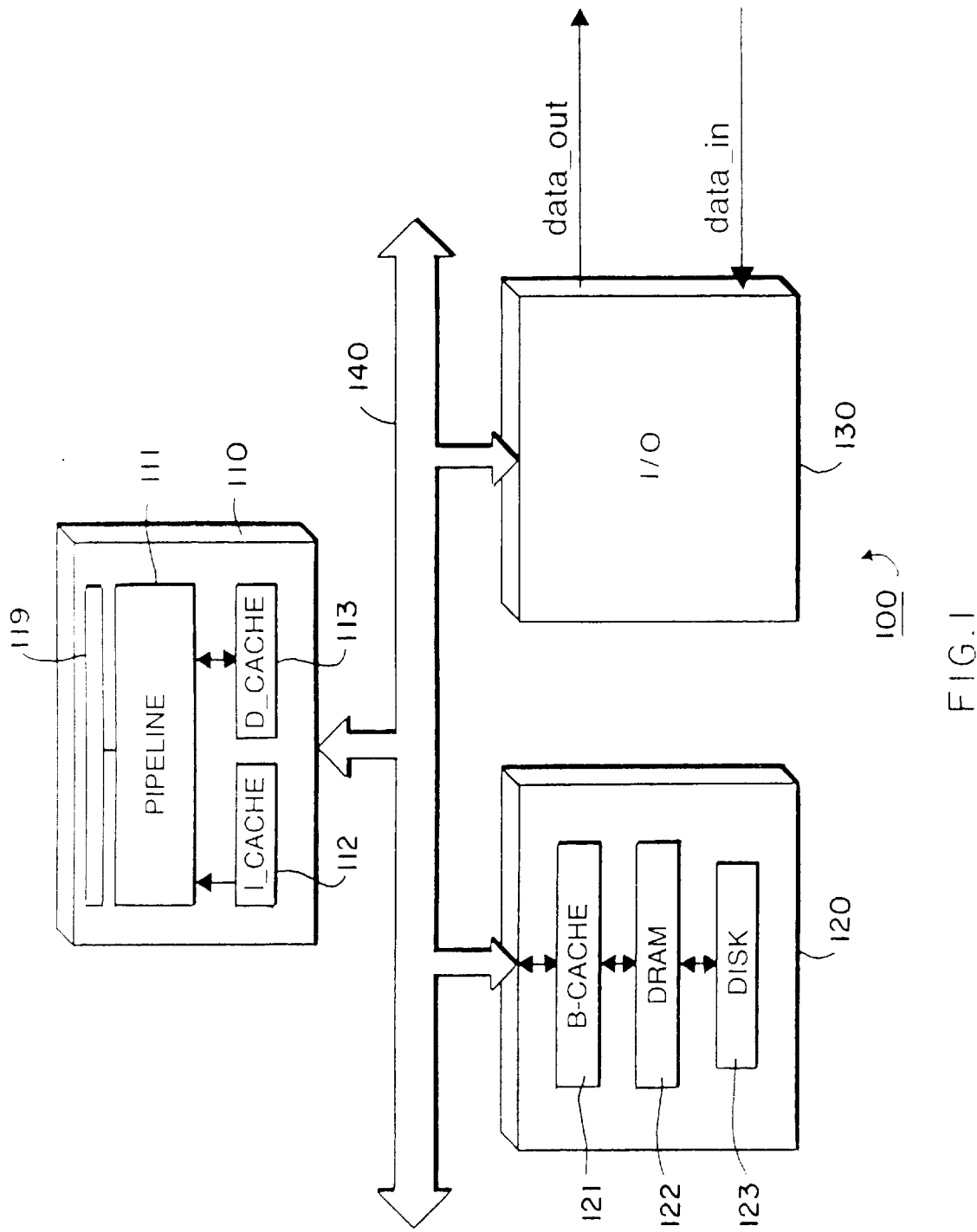
FIG. 1 is a block diagram of a computer system with instruction driven state sampling.

FIG. 1 shows a computer system 100 which can use the sampling method and apparatus as described herein. The system 100 includes one or more processors 110, off-chip memories 120, and input/output interfaces (I/O) 130 connected by bus lines 140. The processors 110 can be implemented on integrated semi-conductor chips as multiple execution pipelines 111 including functional execution units, on-chip data-caches (D-cache) 112 and instruction caches (I-cache) 113, for example, the Digital Equipment Corporation Alpha 21264 processor. The processor chip 110 also includes hardware 119 described in greater detail below for sampling processor states for selected instructions.

The off-chip memories 120 can be arranged hierarchically, including general purpose caches (B-cache or SRAM) 121, volatile memories (DRAM) 122, and persistent memories (disk) 123. The I/O 130 can be used to input and output data to and from the system 100.

Operation

During operation of the system 100, instructions and data of software programs are stored in the memories 120. The instructions and data are generated conventionally using known compiler, linker, and loader techniques. The instructions and data are transferred to the execution pipeline 111 of one of the processors 110 via the caches 112–113. In the pipeline, the instructions are decoded for execution. Some of the instructions operate on the data. Other instructions control the execution flow of the programs.

It is desired to collect detailed performance data while the instructions execute. Performance data can be related to memory operations and execution flows.

Processor Pipeline

Figure 2A:
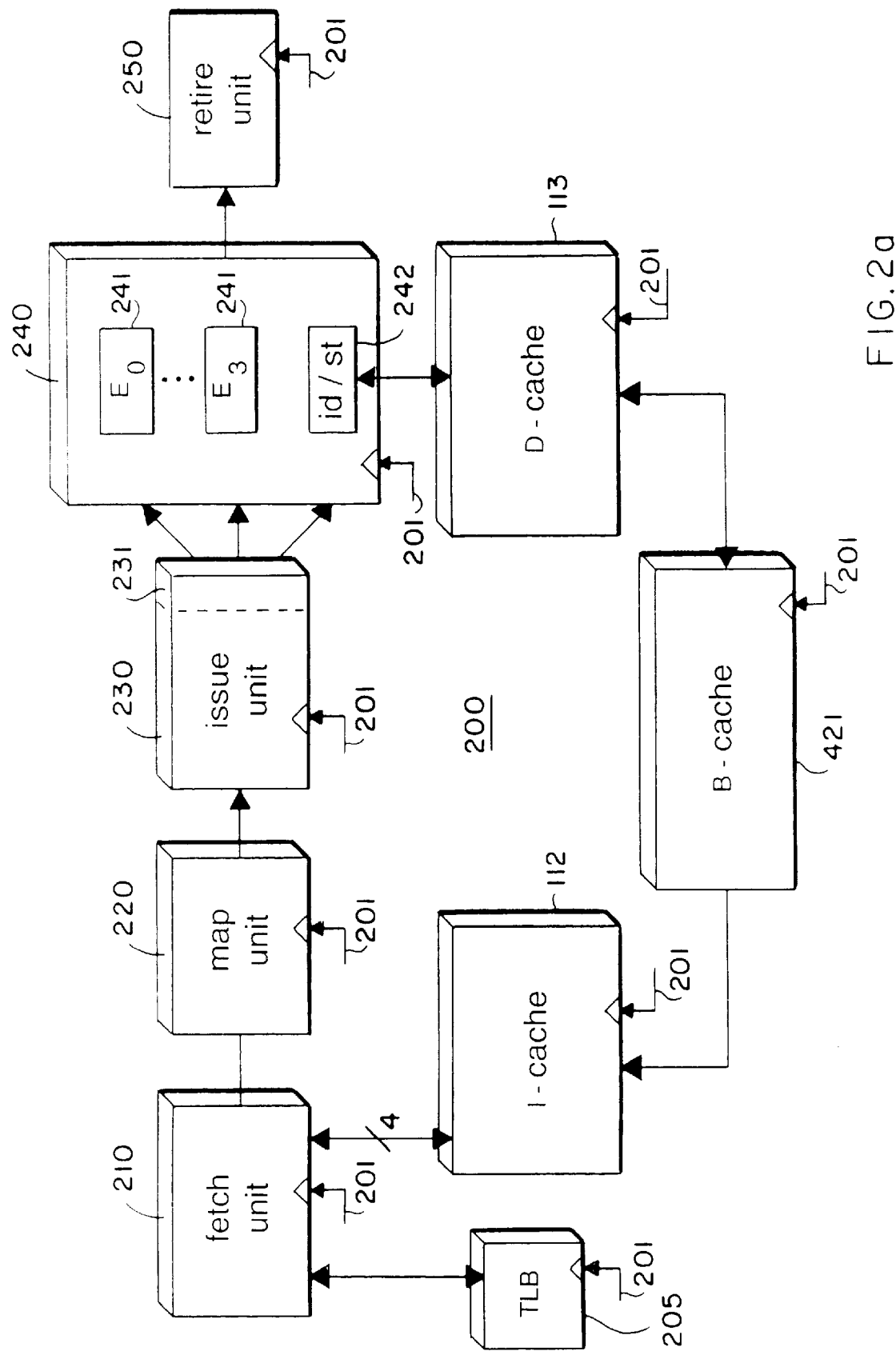
FIG. 2a is a block diagram of a microprocessor execution pipeline for processing sampled instructions.

FIG. 2a shows an execution pipeline 200 of one of the processors 110 of FIG. 1 having a plurality of stages serially arranged as, for example, fetch, map, issue, execute, and retire units, respectively 210, 220, 230, 240, and 250. The rate at which the pipeline 200 processes information (data and instructions) is controlled by system clock signals on lines 201, i.e., so called clock "cycles."

Each clock cycle defines a "slot" or interval of time when a stage of the pipeline 200 can do a discrete amount of processing. A processing slot usually carries forward instructions, and in the case of execution units, described below, data, generally "data items" hereinafter. In some cases, for example, on branch mispredicts or cache misses, or pipeline stalls, the clock continues to cycle, but no meaningful instructions are carried forward.

As an advantage, the present apparatus and method can sample state information about processor slots that carry "garbage" or no useful data. These are known as "wasted" slots. Identifying and sampling wasted slots can be an important precursor to optimizing tasks, since wasted slots do no useful work, and therefore degrade system performance. Therefore, in general, what is being sampled here are not simply "events" or "instructions" as in the prior art, but state information related to pushing processor slots through the pipeline 200, whether they are associated with valid or invalid instructions.

Fetch Unit

The B-cache 121 transfers data items to the I-cache 112 and D-cache 113, respectively. The fetch unit 210, using some type of a translation look-aside buffer (TLB) 205 to resolve virtual addresses to physical addresses, fetches next instructions to be executed from the I-cache 112. The items fetched from the I-cache 112 are generally executable instructions. However, these can also be invalid instructions, as in the case of I-cache misses "garbage" data, i.e., not an instruction.

Preferably, a set of "instructions" are fetched during a single processor cycle. The set can include, for example, four instructions. In other words, the pipeline 200 is four slots wide. The number of slots can depend on the number of available execution units. Other types of processors may fetch fewer or more instructions during a single processor cycle. In general, this means that each cycle fills four processing slots from the cache. Some of the slots may be wasted when the I-cache 112 does not have the available data. Instead of pausing, holding up all processing, the slots are carried forward in any case to make them available for the purpose of sampling, although a garbage "instruction" in a slot may never issue for execution.

During fetching, selected instructions can be augmented with additional information to allow sampling or system profiling. An augmented instruction is described below with reference to FIG. 4. It should be noted that in other implementations, the augmentation of the selected instructions can take place in any of the stages of the processor, including the issue unit 230.

Map Unit

In the system 100, the operands of instructions are dynamically assigned or "mapped" to physical registers using the map unit 220 in the next stage of the pipeline 200. The map unit assigns physical registers to architectural or "virtual" registers. In other words, there may not be a one-to-one correspondence between virtual and physical registers.

Issue Unit

In the next stage, fetched instructions are ordered by an issue unit 230. The issue unit 230 includes an issue queue having a head-of-the-queue entry 231 for the next instruction to be executed. It should be noted, that one or more instructions in the issue unit 230 may be stalled because resources needed by the instructions are not available. Therefore, other pending instructions may be issued out-of-order from the queue 230 "around" the stalled instructions. The correct execution order will be affirmed in the retire unit 250 described below.

Execution Units

The instructions are issued to functional execution units (EO , . . . , E3) 241, and a 1d/st unit 242. Each of the execution units 241 may be designed to handle instructions with specific types of operator codes (opcodes), for example, integer and floating point arithmetic, branching and jump instructions, etc. The 1d/st unit 240 executes memory access instructions, for example, loads and stores data from and to the D-cache 113. The 1d/st unit 242 is especially identified because it may experience long delays. Also note, memory access instructions with long latencies may "complete" long before the data are brought into the processor to improve throughput.

Retire Unit

The termination of execution of an instruction is handled by the retire unit 250. The retire unit 250 commits the processing state. It should be noted, that some instructions may abort or be trapped. For example, the execution flow may change after an instruction is fetched, or an instruction may suffer an exception trap. In these cases, the instruction and all subsequent instructions already in the pipeline are discarded and the speculative processing state is rolled back. As an advantage here, discarded or "aborted" instructions are also profiled, as are wasted processor slots. In other words, termination can mean retiring a completely executed valid instruction, postprocessing a partially executed valid instruction, or discarding an invalid instruction or wasted slot.

The basic idea which underlies the present technique follows the processing of "data items" in selected "slots," primarily instructions, as they progress through the stages of the pipeline 200. Profiling hardware dynamically gathers detailed state information. The state information can come from any of the pipeline stages, or elsewhere in the system 100, for example, first and second level caches, or other sub-systems. The state information can be directly attributed to specific events.

Here, the design strategy is to collect information that is difficult to determine statically in a profile record. This makes the profile record useful for performance tools, profile-directed optimization, or for making resource allocation policy decisions in operating system and application level software, including dynamic adjustments directly in response to the sampling and analysis. Recall, the present method and apparatus is designed to operate on real functional systems.

Figure 2B:
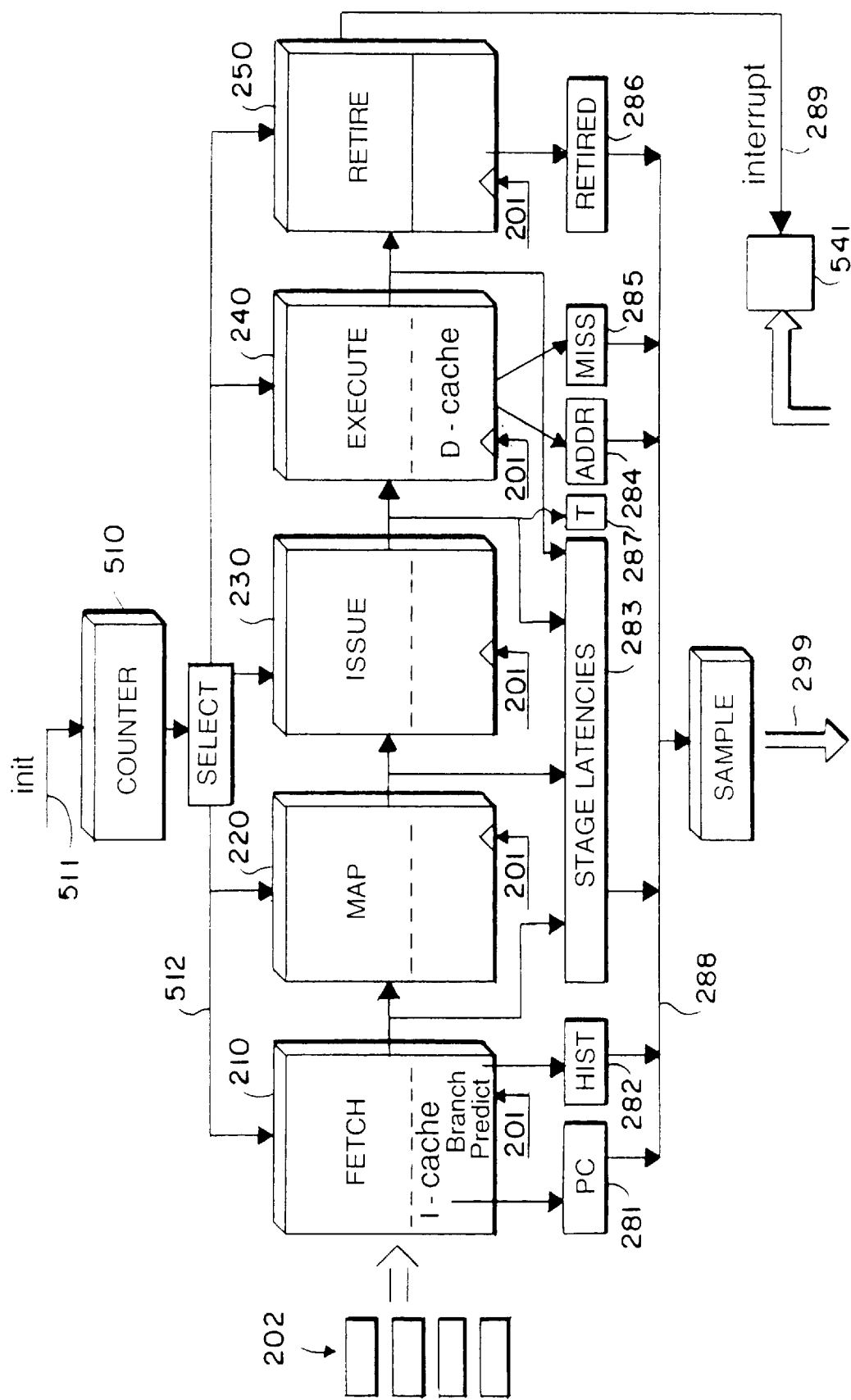
FIG. 2b is a block diagram of the pipeline showing state information which can be sampled.

To determine what state information is interesting to save as part of the profile record, it is useful to examine the information that theoretically is available to the various stages of the pipeline 200 of a modern out-of-order microprocessor as shown in FIG. 2b.

As shown in FIG. 2b, the stages of the pipeline are fetch 210, map 220, issue 230, execute 240, and retire 250. During any of the stages, depending on a particular implementation, any "in-flight" instruction" 202 processed by the pipeline 200 can be selected for sampling by line 512. The selection is controlled by a value of a counter 510. The value of the counter can be initialized by line (init) 511.

State information, such as instruction addresses (PC) 281, branch history bits (HIST) 282, stage latencies 283, branch taken indication (T) 287 data address (ADDR) 284, data miss (MISS) 285, and retired status 286 can be sampled on lines 288. Termination of the processing of the selected instructions can generate an interrupt signal on line 289. The interrupt signal 289 can cause software to sample the state information 281–286 via lines 299. Alternatively, software may poll line 289 via an internal processor register 541.

Superscalar Out-of-Order Processor Architecture

An out-of-order execution processor fetches and retires instructions in order, but executes them according to their data dependencies. An instruction is said to be "in-flight" from the time it is fetched until it terminates, e.g., retires or aborts. Instructions, after mapping, are placed in the issue unit 230, and wait there until registers holding input operands are updated.

Each processor cycle, the fetch unit 210 fetches and decodes a set of instructions from the instruction cache 112. The instruction decoder, which may be part of the fetch unit 210, identifies which instructions in the fetched set are part of the instruction stream. Because it takes multiple cycles to resolve the program counter (PC) of a next instruction to fetch, the next PC is predicted by a branch or jump predictor, which may be part of fetch unit 210. If the prediction is incorrect, then the processor will abort the mispredicted instructions, i.e., the instruction fetched on a "bad" path, and will restart fetching instructions on the "good" path.

To allow instructions to execute out-of-order, registers are dynamically renamed by the map unit 220 to prevent write-after-read and write-after-write conflicts. Two instructions that write the same virtual register can safely execute out-of-order because they will write different physical registers, and consumers of the virtual registers will get the proper values. Instructions are fetched, mapped, and retired in order, although they may execute out-of-order.

The register map unit 220 assigns operands of fetched instructions to valid physical registers. That is, the virtual names of the register operands are renamed to the physical register space of the processor. Instructions then proceed to the instruction queue 230 where they wait for two events before executing. First, their register dependencies must be resolved. Second, the resources the instruction needs, e.g., execution units, registers, cache ports, memory queues, etc., must be available. This means that required resource cannot be reallocated for any currently mapped instructions.

When these two conditions are met for an instruction, the instruction's operands are looked up in the physical register file. The content of the operand registers and some information about the instruction are then sent to the appropriate execution unit 240 and executed. When the instruction is finished executing, and the instruction is the oldest "non-retired" instruction in the processor, the instruction retires. This frees the resources used by the instruction, such as physical registers and cache ports.

Numerous events may delay the execution of an instruction. In the front of the pipeline, the fetch unit 210 may stall due to an I-cache 112 miss, or the fetch unit 210 may fetch instructions of a mispredicted path. The map unit 220 may stall due to lack of free physical registers, or lack of free slots in the issue unit 230.

Instructions in the issue unit 230 may wait for their register dependencies to be satisfied, or for the availability of execution units 240. Instructions may stall due to misses in the D-cache. Instructions may trap because they were speculatively issued down a bad path, or because the processor took an interrupt, such as an illegal operation or memory address. Many of these conditions are difficult to predict at compile-time, and all of them degrade the performance of the system 100. This makes it valuable to sample the information available on lines 288.

Profile Information Register

Figure 3:
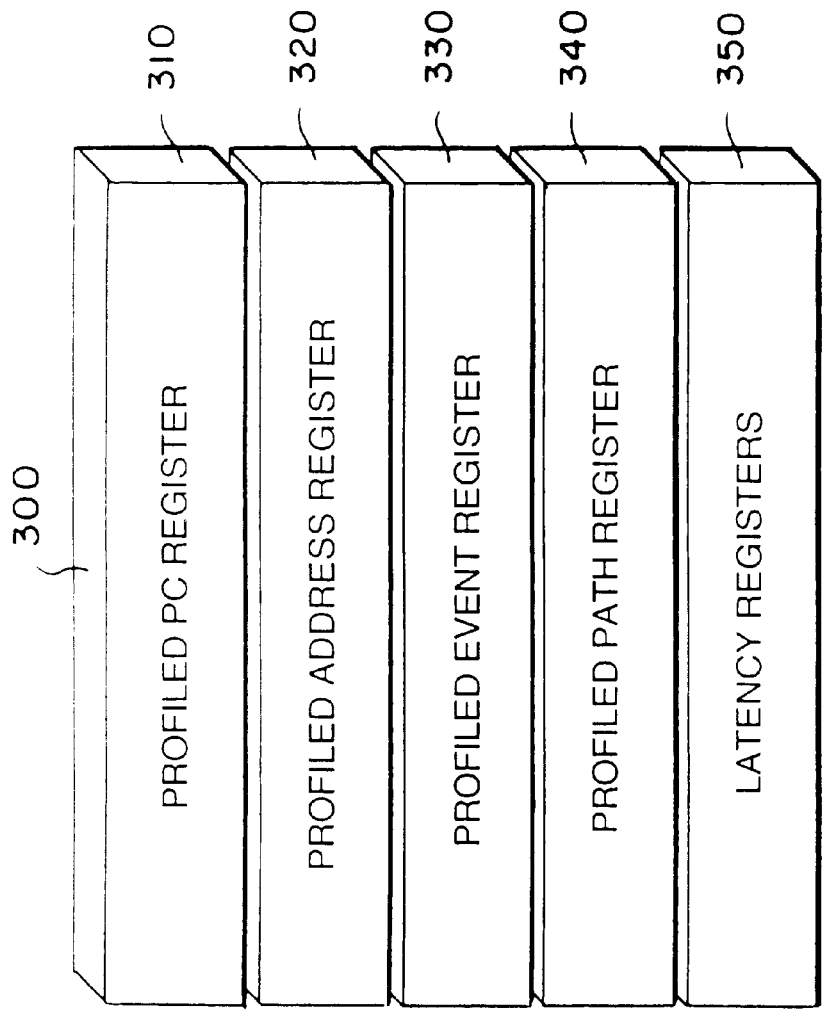
FIG. 3 is a block diagram of a register file for storing profile information.

Therefore, as shown in FIG. 3, there is provided a memory 300 for storing profile information for each instruction being sampled. The memory 300 can be in the form of a register file or buffer. In other words, a selected instruction that will be sampled is directly identified with the register file 300. The register file 300 can include a plurality of registers. Alternatively, the file 300 can be implemented as a single indexable register with multiple fields.

The file 300 is coupled to the components of the pipeline 200 by lines 288 of FIG. 2b so that performance information related to the selected instruction can be captured for each stage of the pipeline 200. It should be noted that the profile registers 300 are more than simple "event" counters as found in the prior art, here the registers collect performance information that is attributable to specific known instructions and events.

In FIG. 3, the number of bits allocated for each register depends on the type of information stored therein, for example, instruction addresses (64 bits), cycle counts, i.e., latencies (8 or 10 bits), discrete events (1 bit per event) and so forth. These numbers are merely a guideline. Other implementations may use different numbers of bits for the various registers 300, this is a design choice.

In the preferred embodiment, a profile PC register 310 stores the PC of the selected instruction. As described below, an instruction that is being profiled has a "profile" bit asserted. The PC register 310 can also include the opcode of the selected instruction. In addition, for processors which permit multi-threaded execution additional bits of the register 310 can store the identifier of the thread. Other fields of the register 310 can store the process identifier, the address space number, the CPU number, and the instruction number (inum) of the instruction being executed. In addition, on processors having multiple logical register sets, i.e., hardware contexts, and simultaneously executing threads, register 310 can hardware context and thread identifiers. By storing this information, the profile information can be directly attributed to a specific instruction. In addition, the sampled information can be filtered according to range of addresses, opcode, execution threads, address spaces, and the like.

A profile effective address register 320 is loaded with an address associated with the selected instruction. If the instruction is a memory access instruction, such as a load or store, then the effective 64-bit virtual memory address is captured. If the instruction is a jump or branch, then the target PC is recorded.

As an advantage of the present sampling technique, all "instructions" processed by the pipeline 200 have an equal probability of being selected for sampling, independent of the sampling rate. The instructions can be valid instructions, invalid instructions, non-interruptible instructions, or "garbage" instructions. Thus, the captured effective addresses are statistically representative of the overall behavior of the program. By capturing the effective addresses of sampled instructions, memory accesses and execution flows can precisely be correlated to actual dynamic executions.

A profiled event register 330 is partitioned into, for example, one bit fields. The 1-bit fields record events for the selected instruction. When an instruction is first selected, the register is cleared. Events could include cache misses, branch mispredicts, resource conflicts, traps and exception conditions, retire/abort/invalid, TLB misses, taken/non-taken, data dependency stall, resource dependency stalls, and so forth. Note, this implementation allows multiple events to be attributed to a single instruction. It should be noted that event information is collected for both retired and aborted instructions. In order to reduce the size of the event register 330, some of the bit fields can be used to record different types of mutually exclusive events depending on the opcode of the instruction.

A profiled path register 340 is used to capture recent branch taken/not-taken information from a branch history table. Branch history tables are well known in the art for other uses. Global branch taken history can be used to indicate the execution path which caused the selected instruction to be fetched. Note that the instruction does not have to be a branch instruction for this information to be useful. The use of the path information is described in greater detail below.

Latency registers 350 store timing information taken at check points while a selected instruction is in flight, e.g. between the various stages of the pipeline 200. The checkpoints may differ from processor to processor depending on where an instruction might be stalled waiting for some event or resource. Each latency register 350 counts the number of cycles an instruction spent between two checkpoints.

When the selected instruction passes a checkpoint, i.e., entering a next stage in the pipeline 200, the corresponding latency register 350 is first cleared and then incremented once per cycle until the instruction passes the next checkpoint, then next latency register is initialized and begins counting. The number of latency registers 350 depends on the number of stages of the pipeline 200 in a particular implementation. A complete latency profile is stored in the latency registers 350 when the instruction aborts or retires.

A list of potentially useful latencies to collect includes: fetch-to-map, map-to-data ready, data ready-to-execute, execute-to-retire ready, retire ready-to-retire delays. For memory instructions (loads and stores) latencies can be issue-to-completion. This last latency differs from other latencies in that some memory operations may be ready to retire before the data they operate on have actually been brought into the processor. These latencies could be directly counted in the registers 350, or the registers can collect raw cycle counts, in which case, profiling software computes differences between raw counts for successive stages to determine actual latencies. A circuit which counts example pipeline latency clock cycles is described below with reference to FIG. 6.

The updating of the information in the register(s) 300 does not have to happen immediately, a delay is acceptable. All that is required is that the interrupt signaling the fact that the selected instruction has completed (retired or aborted) is delayed until all information in the register file 300 have been updated, or the interrupt handler can stall until the profile file 300 has been updated.

It should be noted that the profile register file 300 can be replicated. If there are multiple copies of the profile register file, then multiple instructions can be selected for profiling, either serially, or concurrently. In this case, each selected instruction is explicitly identified with a specific register file as described below. Multiple register files can be sampled in response to a single interrupt signal to reduce the amount of overhead.

Augmented Instruction

Figure 4:
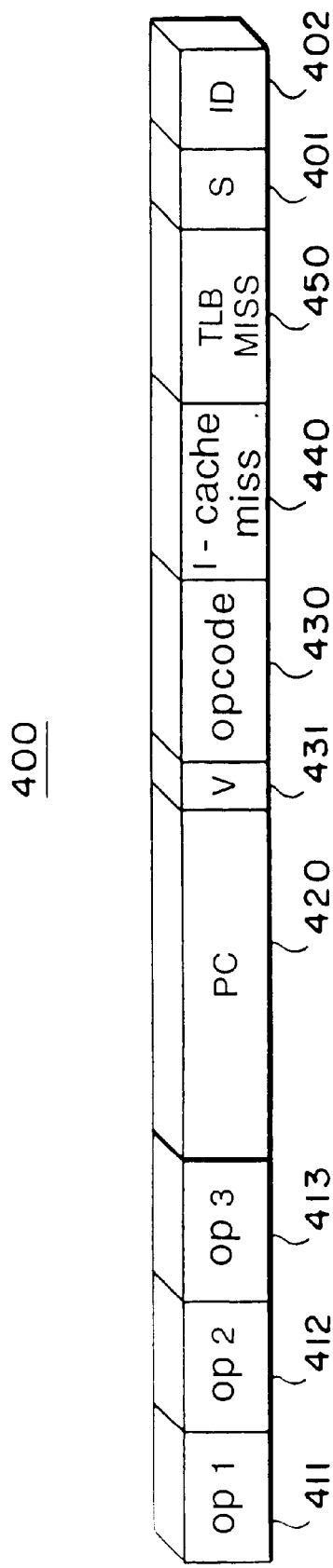
FIG. 4 is a block diagram of an augmented instruction.

As shown in FIG. 4, each instruction 400 includes a sample field. For example, the sample field can be a one bit tag called the "sample" bit (S) 401. When the sample bit 401 is asserted the instruction is selected for sampling. Asserting the bit 401 actives the sampling hardware which collects the profile information, and also causes the interrupt when the selected instruction completes (retired or aborted). Alternatively, each "instruction" fetched can be consecutively numbered with an "inum" value. In this case, instructions with specific inum values can be selected. The mechanism for selecting instructions is described below.

The profile register file 300 can be read when the fields have been updated and the interrupt signal is generated. The interrupt signal can cause privileged profiling software (PSW) to process the contents of the profile registers 300. It should be noted that in the case where multiple samples are recorded, a single interrupt can cause the sampling of performance data for multiple selected instructions.

Depending on the implementation, the augmented instruction 400 can include the following additional fields, up to three instruction operands (op1, op2, and op3) 411–413, the program counter (PC) 420, the operator code (opcode) 430. A valid field (V) 431 can indicate whether the "instruction" in the selected slot is valid or not by setting a one bit field to either true or false. Fields 440 and 450 can be reserved for indicating instruction related I-cache and TLB misses, respectively. Note, because a single instruction can include multiple operands, multiple misses are possible for that instruction.

Profile Register File ID

In a slightly more complicated design, multiple instructions may concurrently be profiled. In this implementation, there are a plurality of register files 300 or single larger registers with sub-fields, the number of files 300 corresponding to the number of in-flight instructions which can concurrently be profiled. To handle this case, the instruction 400 is also augmented to include a sample register file identifier (ID) field 402. This allows profile information to be directly linked to one of the several register files 300. As noted above, here there is a direct association between selected instructions and profile registers. The profile information collected in the registers is therefore directly attributable to a specific instruction.

Even when only one in-flight instruction is profiled at a time, it may be useful to have the file or register 300 be indexed by the ID field 402 so that the cost of the profiling software's interrupt handler may be amortized over several instruction samples. To determine whether an instruction within a set of instructions is a selected instruction can be performed by using a "wired-OR" operation.

Random Sampling

The overhead of the present profiling is reduced by restricting the number of instructions that can concurrently be profiled, e.g., bit 401 is set. Instead of profiling every instruction in a program or a part of the program, here instructions to be profiled are selected during a specific stage of the processor pipeline 200, e.g., during fetching, and the selected instructions are tagged by asserting the sample bit 401. If the sample bit 401 is asserted, then the components of the pipeline 200 forward profile information to the profile register file(s) 300.

The following sections describes the supporting details of instruction level profiling as described herein.

In-Flight States

First, each decoded instruction state that passes through the processor pipeline 200 is augmented with additional information as described above. An instruction is considered to be in flight from the time it is fetched until it retires or aborts. As stated above, the instruction is augmented with at least one sample bit 401. The sample bit 401 is part of the state of every in-flight instruction and cache/memory request. When the bit 401 is asserted, the bit indicates that profiling information is recorded for this instruction, otherwise not.

In a simplified design, only one in-flight instruction at any one time is allowed to have its sample bit 401 asserted. The sample bit 401 remains asserted for the selected instruction until the instruction retires or is aborted. In a more complex design with multiple register files 300, multiple in-flight instructions can individually be profiled, and additional bits can be asserted.

Profiled Instruction Selection and Sampling

Figure 5:
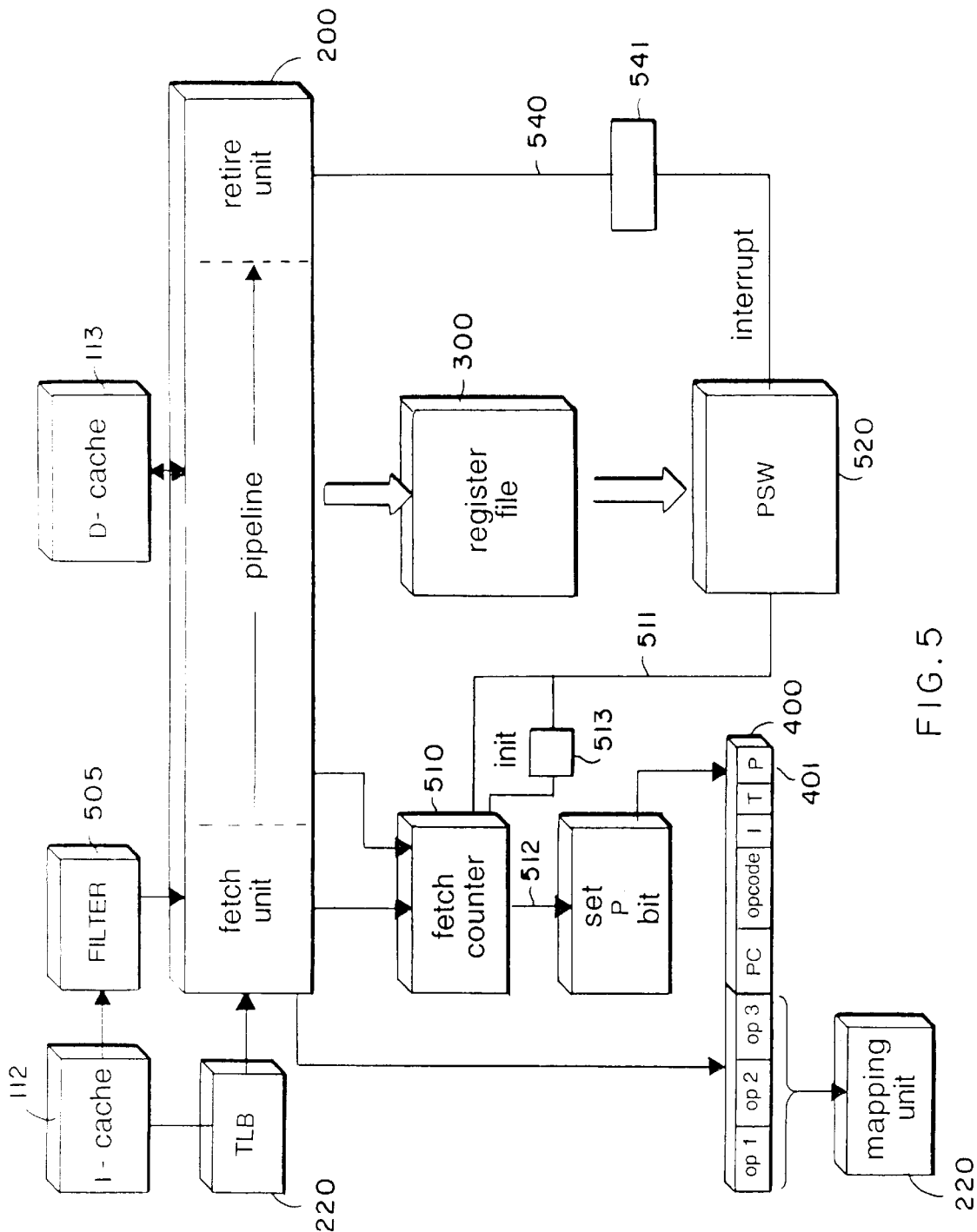
FIG. 5 is a flow diagram for profiling selected instructions.

As shown in FIG. 5 for a fetch stage implementation, selection of instructions to be profiled, and sampling of profile information proceeds as follows. A fetch counter 510 is initialized by, for example, privileged profiling software (PSW) 520 via line 511. The PSW 520 can initialize the counter 510 with a value randomly selected from an interval of values having a predetermined size. Thus, the sampled instructions will not correlate with any specific patterns in the execution of instructions. The size of the interval determines the average frequency of sampling. Other randomizing techniques to initialize the value of counter 510, including hardware, may also be used.

Without random sampling, for instance when instructions are sampled at a fixed frequency as in the prior art, it may not be possible to generate a statistically correct profile of all instructions fetched, e.g., the aggregate operation of the system 100. This is particularly true for an execution thread having execution loops that include a number of instructions that is not relatively prime with respect to the rate of sampling, e.g., for a loop with instructions and a sampling interval of 65536 instructions. Other regularized sampling would have the same problem. There, samples from only one of the two instructions will ever be collected. As an advantage, randomly selected instructions will produce correlations independent of the length of the sampling interval.

For each instruction 400 fetched, the counter 510 is incremented or alternatively, in a different implementation, decremented from its initial value by the fetch unit 210 of the pipeline 200. When the counter 510, depending on the implementation, either over flows or under flows, the current fetched instruction has its sample bit 401 asserted, and the ID field 402 can also be initialized when multiple instructions are selected for sampling.

In an alternative embodiment, the counter 510 is incremented every cycle, instead of for each instruction fetched, e.g., the counter 510 counts fetch opportunities and not actual instructions fetched. For example, if the fetch unit 210 can fetch four items from the I-cache 112 during each clock cycle, then there are four fetch opportunities. It may well be that one or more fetches from the I-cache will miss, or fetch a "bad" instruction. In the case of a miss, the slot available for the missed instruction will contain "garbage," and the instruction will need to be marked as invalid. A bad instruction is one that lies on a bad execution path, or will otherwise abort.

Counting cycles instead of fetched instructions advantageously simplifies the design. Just counting valid fetched instructions can be quite complicated because control flow can branch into, or out of the group of fetched instructions, and it becomes necessary to decode all instructions to determine which are valid, no longer is it a simple matter of just incrementing the counter by four.

As an advantage, anything (good instructions, bad instructions, garbage instructions) that are fetched from the I-cache during a cycle can be selected for sampling so that the true performance of the I-cache 112 and pipeline 200 can be determined. Here, there is no bias, so the results will be a statistically correct estimate of the performance of the system.

This distinguishes over known techniques which may only select every valid instruction for a short fixed period of time, or at spaced fixed intervals. In either case, the strategy is to minimize overhead. Neither technique is capable of capturing the performance data of entire systems.

Filtering Instructions

What is selected can be filtered by a filter 505. Filtering can be on the basis of instruction opcode, operands, or more complex filtering criteria such a first type of instruction followed by another type of instruction within some period of time. If there is filtering on the input to the pipeline 200, then the counter 510 can be reset. There a number of ways to do this. In one way, the current initial value of the counter 510 is stored in an init register 513. When an instruction is filtered, the counter 510 is reloaded with the value stored in the init register 513 to recall the initial randomized selection.

After the instruction has been augmented, the pipeline 200 provides the profiling information 281–286 of FIG. 2b to the register file(s) 300. The retire unit 250, in response to the instruction completing or aborting, completes the filing of profile information, and generates an interrupt signal on line 540 so that the PSW 520 can sample the profile information.

Alternatively, PSW 520 may poll line 540 via an internal processor register or memory location (541). As one feature of the present technique contrast to some prior art profiling techniques, there is no impact on the processor cycle time even though the present technique delivers precise information about states across the processor. The only time constraint is that all profile information must be recorded before the profile registers 300 are sampled.

Latency Counter

Figure 6:
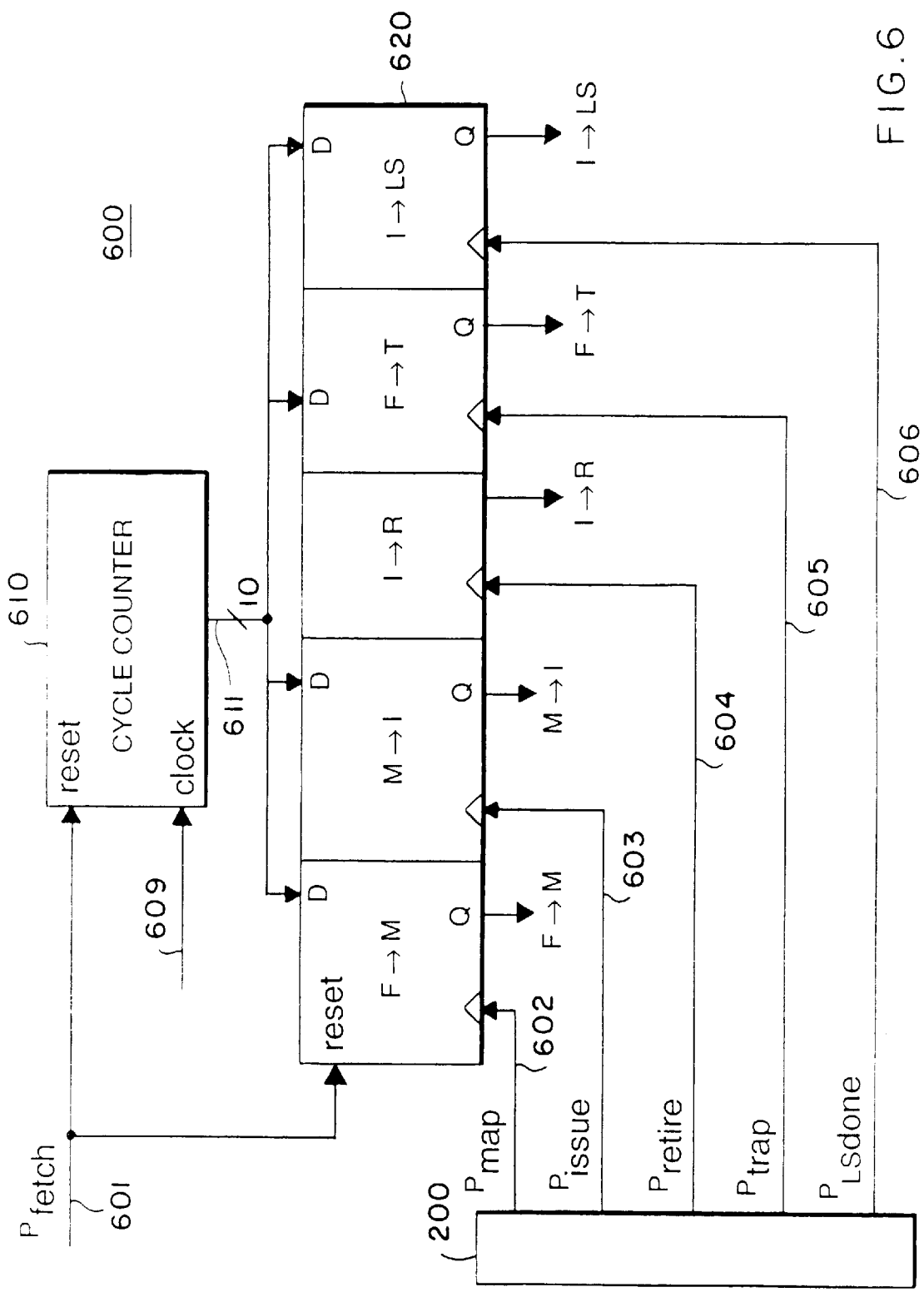
FIG. 6 is a schematic of a circuit for measuring pipeline latencies.

FIG. 6 shows a circuit 600 for counting exemplary latencies: fetch-to-map (F M), map-to-issue (M I), issue-to-retire (I R), fetch-to-trap (F T), and issue-to-ldst (I LS). The circuit 600 includes a cycle counter 610 coupled by line 611 to latches 620.

The cycle counter 610 and latches 620 are initialized by signal P-fetch on line 601. This signal is generated when an instruction to be profiled is fetched, for example, a signal derived from the sample bit 401. The counter 610 is incremented by clock signals on line 609. Each clock signal corresponds to one processor cycle.

As the instruction 400 progresses through the stages of the pipeline 200, stage transitions in the pipeline 200 trigger signals Pmap, Pissue, Pretire, Ptrap, and PLSdone respectively on lines 602–606. The corresponding latches 620 can be read on lines 612–616 for storing in the profile latency registers (or fields) 350 of FIG. 3.

Profiling Applications

The profiling hardware described above can be utilized in a variety of different ways. Because the present technique provides very detailed information about the execution of individual instructions, one application could profile a large number of instructions. The sample information can be stored in a memory buffer for later processing by profiling tools to produce detailed instruction-level information.

The information can be used to develop, for example, histograms of load latencies for each load instruction, histograms of instruction execution times, and perhaps even a moderately comprehensive analysis of the pipeline state for each instruction. Because the amount of information provided by this approach is likely to be quite high, the overall memory overhead of the present technique is also likely to be quite high because a substantial amount of memory traffic is involved. For example, if a billion instructions are fetched per second, and sampling is performed every 10,000 fetched instructions, then the data rate for the profile information will be approximately 2.4 MB per second.

The following section describes software-implemented methods for reducing bandwidth by aggregating profile information.

Data Reduction by Filtering Output Profile Information

The volume of sampled data can be reduced by ignoring some fields of the profile record, e.g., the data in the profile registers 300, except when they are explicitly requested. A user of the system 100 may desire different levels of profiling. In a lowest overhead mode, the profiling application software can generate a profile report for all or part of a program, using just the PC and retire-delay fields. Depending on the optimization to be performed, other per-PC values may be summarized by averaging or other statistical metrics, such as minimum, maximum, or computing standard deviation. Given more time to process data, the profiling application may produce histograms of various instruction latencies.

The effective memory address, branch target address, and branch history samples will likely require more expensive processing than the other fields. These fields can probably be ignored except when gathering data to perform specific optimization tasks. Given the inter-instruction fetch distance between instructions in cycles, the profiling application can also gather information about levels of concurrency.

Filtering of the profiling information can also be done by hardware means, for example, a mask register, or programmable logic. For example, only sample when there was a cache miss, or when the instruction retired, or other Boolean combinations of opcodes, operands, addresses, events and latencies.

Determining Hardware Operation

The present profiling technique can be used to get a precise understanding of the internal operation of an out-of-order issue processor, such as the Alpha 21264 processor. One of the first things to notice about this type of machine organization is that there are many places where an instruction might stall in the pipeline 200, and a large number of reasons why it might stall.

For example, an instruction might stall in the issue unit 230, either because some of its operands are not data ready, because some of the resources required for the execution of the selected instruction are unavailable, or because other instructions were chosen to execute ahead of it.

An instruction might stall in the map stage, which makes virtual to physical register mappings, either because the machine is out of physical registers, or because there are too many instructions in flight, or because the issue unit 230 is full; meaning there is no place to put the about-to-be executed instruction. Alternatively, an instruction might stall in the retire unit, because previously issued instructions, in program order, have not yet completed.

Determining exactly where an instruction stalled, why it stalled, and how long it stalled depends heavily on the precise state of the machine when that instruction is executed. Because the processor is so dynamic, it is difficult for software performance tools to determine this state statically.

Operational Summary

Figure 7:
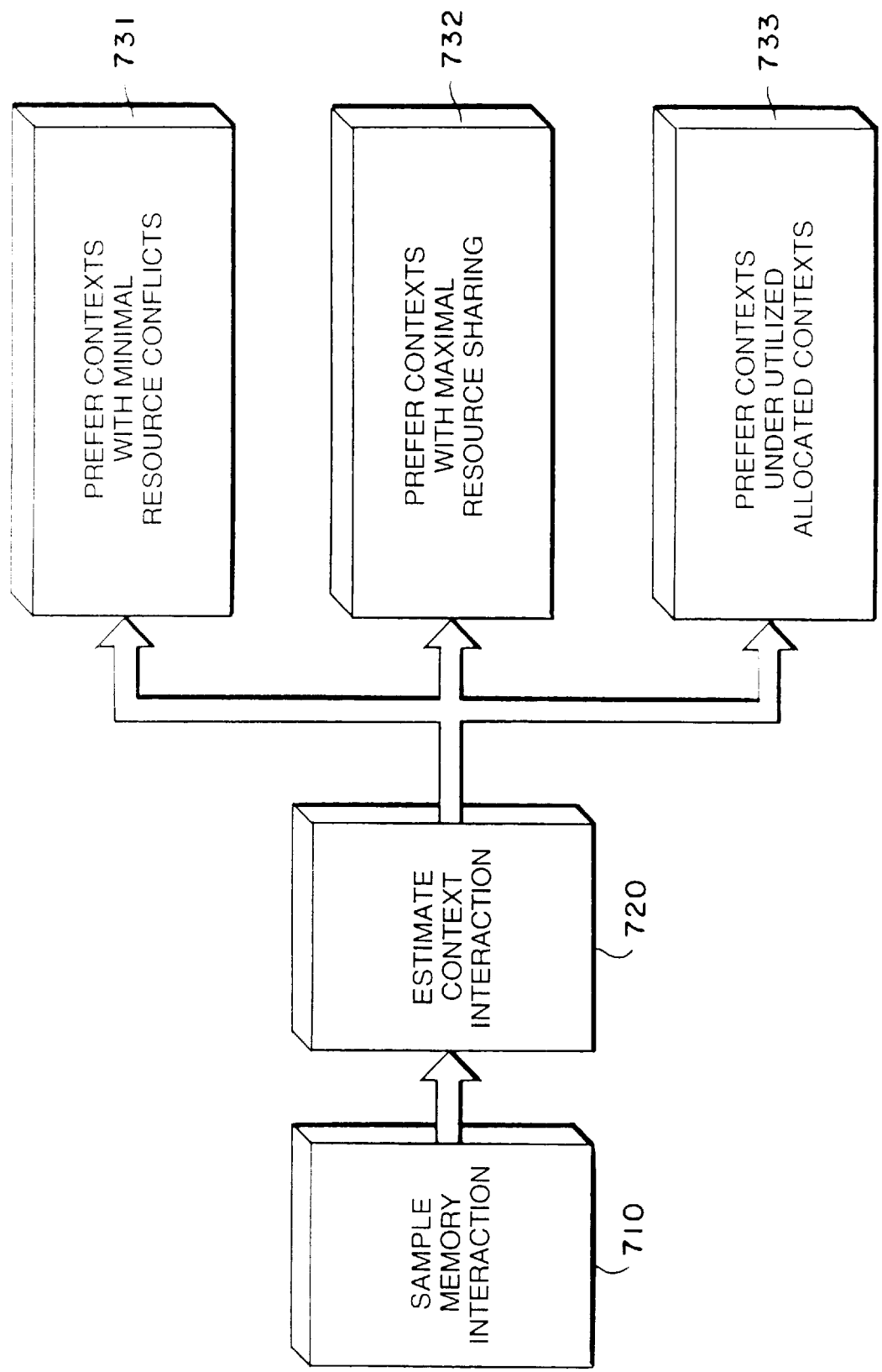
FIG. 7 is a block diagram of estimating context interaction from sample memory interactions.
Figure 7A:
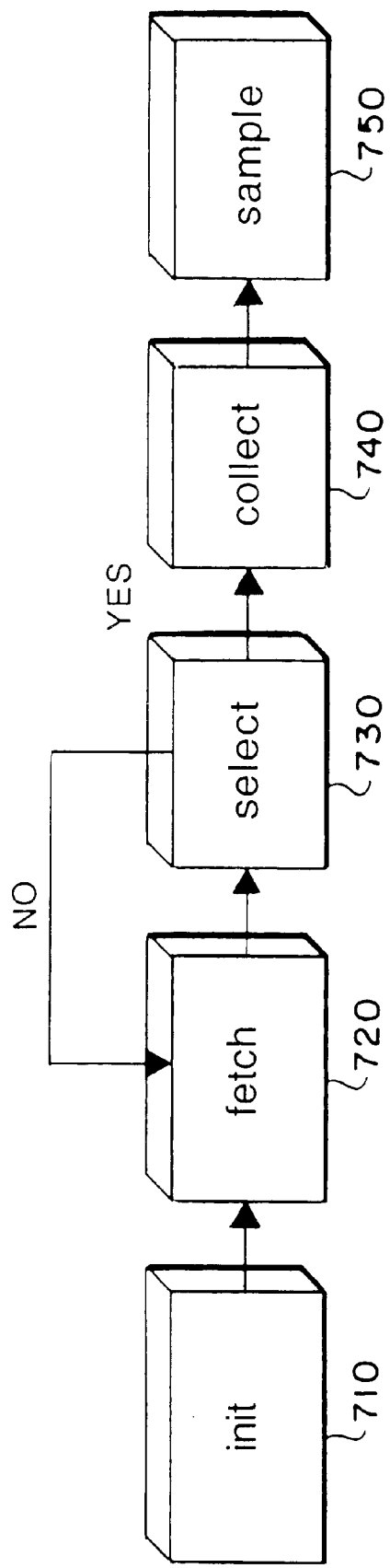
FIG. 7a is a flow diagram of a process for sampling instructions.

As shown in FIG. 7a, a method 700 for profiling can include the following steps. The profiling state is initialized in step 710. Here, registers are cleared and counters are assigned their initial values. In step 720, an instruction is fetched and counted. In step 730, the instruction is selected when the number of fetched instructions since initialization is equal to a predetermined random number. The selected instruction is augmented to indicate its selection.

As the selected instruction progresses through the execution pipeline 200, profile information is collected in step 740. Upon completion (retired or aborted), the collected information is sampled in step 750. Sampled information can be buffered for subsequent processing. It is also possible to sample a particular profiling state to extract more detailed information.

Estimating Statistics of Properties of Processed Instructions

Figure 7B:
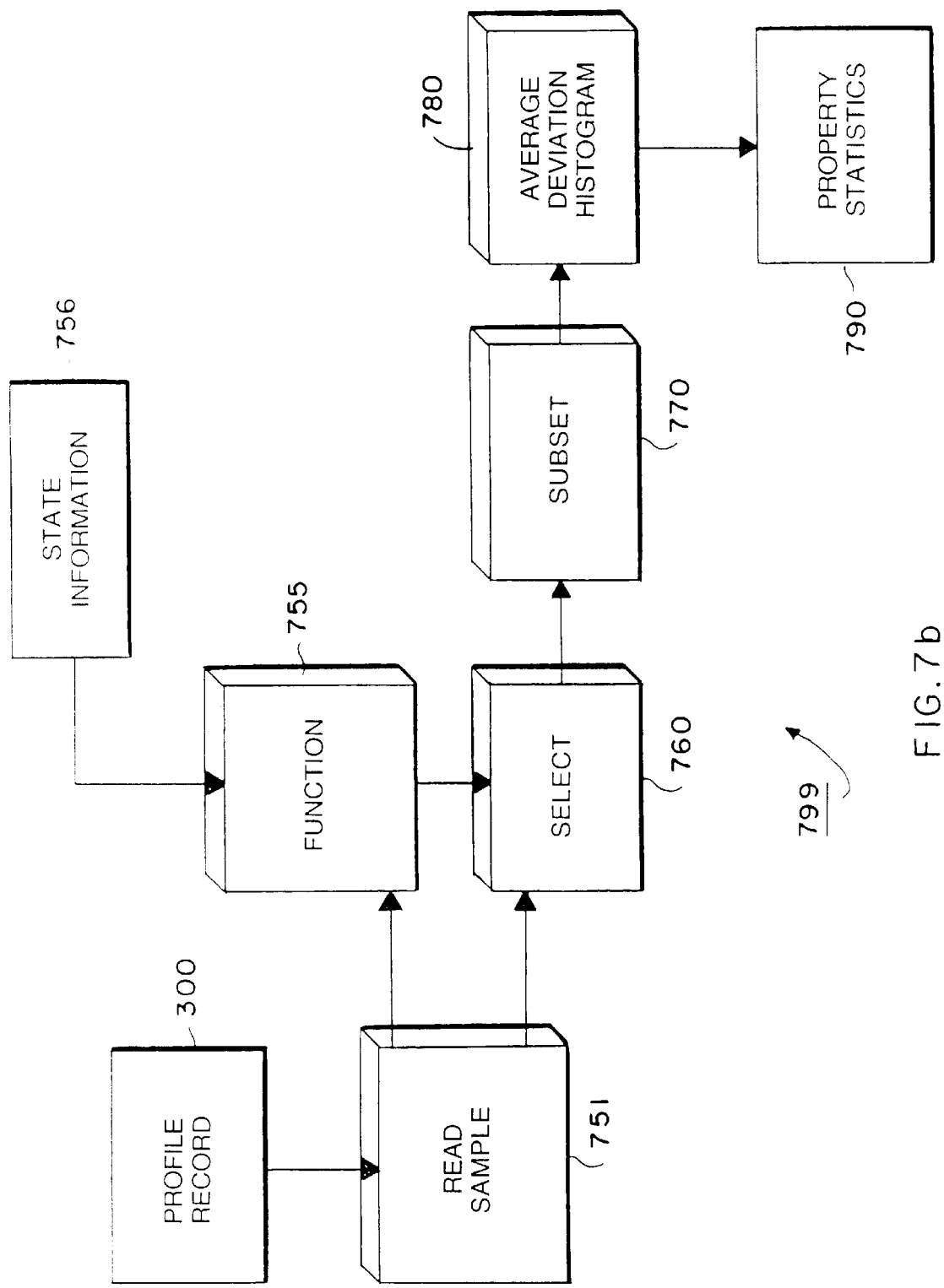
FIG. 7b is a flow diagram of a process for estimating statistics of properties of instructions processed by the processor pipeline.

As shown in FIG. 7b, a process 799 estimates statistics of properties of instructions processed by the pipeline 200. The process 799 can include the following steps. Step 751 reads the profile record 300 sampled as described above in step 750. The record is read when the selected instruction completes. In step 760, the sample is selected or discarded depending on a function 755 which takes into consideration state information of the system.

For example, function 755 takes as input state information 756 such as addresses, process identifiers, address space numbers, hardware context identifiers, or thread identifiers of the selected instructions. Function 755 may also use state information such as path-identifying information, opcodes, operands, latencies, or events experienced by the selected instructions. The event information can be retire/abort/invalid status, cache hit/miss, branch mispredict, trap status, TLB hit/miss, and data resource dependency status, and so forth.

Step 760 produces a subset of samples based on the function 755. In step 780, statistics 790 are determined. These statistics can include averages, standard deviations, histograms (distribution), and error bounds of the properties of the sampled instructions. For example, average rates at which specified events occur, average latencies of instruction execution and memory accesses. Averages of execution rates of processes, threads, or hardware contexts can also be determined. The histograms can show the distribution of instruction execution, memory access rates, or latencies.

The bound on the errors can be approximated by a reciprocal of a square root of the number of samples for the particular property being sampled.

N-wise Sampling

The profiling technique described herein can also be used to perform N-wise sampling. Here, the dynamic state of interactions between multiple concurrently executing instructions can be captured. Instead of profiling a single in-flight instruction, two or more separate instructions are concurrently profiled. The dynamic "distance" between the selected instructions can be measured as the number of instructions fetched, or the number of processor cycles that "separate" the in-flight instructions. Any of the events counted by counter 510 may be used to measure the distance between selected instructions, e.g., clock cycles, instructions fetched, etc.

Profile information for N-wise sampled instructions has many possible uses. First, the information can be analyzed to measure useful concurrency levels. This makes it possible to locate true bottlenecks. True bottlenecks are characterized by long stalls coupled with low concurrency. N-wise samples can also facilitate path profiling, and disambiguate candidate execution paths by constraining the paths to include at least two points along the path. Furthermore, from N-wise sampling it may also be possible to statistically reconstruct detailed processor pipeline states. Here, the selection of the group of instructions can be based on some measure of similarity between the instructions, for example, recent branch history, stalls, instruction types, or other recent state history.

Measuring Useful Concurrency

Pinpointing performance bottlenecks in out-of-order processors requires detailed information about both stall times and concurrency levels. In contrast to in-order processors, a long-latency instruction is not problematic when there is sufficient concurrency to efficiently utilize the processor while the long-latency instruction is stalled.

One approach for obtaining concurrency information is to snapshot the entire pipeline state. That will directly reveal where sets of concurrently executing instructions are in the stages of the pipeline at a given point in time. However, "dumping" the entire pipeline state into sampling registers and buffers could be extremely costly, both in time and space. Furthermore, the voluminous data produced probably cannot be efficiently aggregated to amortize the cost of sampling. Worse yet, this approach is actually insufficient because only those instructions that retire are counted as "useful," and information about which instructions fetched but may abort is not yet known.

Nested Pair-Wise Sampling

One type of N-wise sampling minimizes the compromise between single-instruction profiling and full pipeline snapshots. Here, statistical pair-wise sampling is performed in a nested manner so that for a given selected instruction another instruction that may execute concurrently is directly sampled.

Hardware Support for Nested N-Wise Sampling

N-wise sampling comprises the following hardware features. First, the hardware must allow profile information to be captured for at least two concurrent in-flight instructions. The set of profile registers must be replicated to support multiple distinct sets of profile records, and the single sample bit 401 must be augmented to a more general ID field 402. Second, the hardware must allow the distance between the selected instructions to be dynamically changed by varying the sampling rate. This could be done by hardware or software. It should be noted that the size of the set of concurrent sampled instructions (N-wise, where N>1) could be made larger with additional replication of counters and registers.

For example, the privileged profiling software 520 can dynamically vary the size of the interval from which the initial values of the, in the pair-wise case, two fetch counters 510 are randomly selected. This allows the inter-sample fetch distance for the pair of instructions to be specified at the same time. The hardware can support a relatively large inter-sample fetch distance for maximum flexibility at the software level.

Ideally, the second fetch counter would be the same size as the core fetched-instruction counter 510 so that any two independent instructions that are a sufficient distance apart can be selected. A 10-bit counter would suffice for the Alpha 21264 processor. A smaller counter may suffice for measuring concurrency when counting fetched instructions, a larger counter may be needed if cycles are counted. For nested N-wise sampling, the hardware must also measure the inter-sample fetch-to-fetch latency in cycles, allowing multiple latency register 350 to be correlated in time.

Nested N-wise Sampling Application

Higher-level application software can exploit nested N-wise sampling to measure useful concurrency. The key idea here is to allow for the sampling of a set of instructions that may potentially execute concurrently. Nested sampling is based on the same statistical arguments that justify ordinary sampling, that is, the sampling is applied recursively. Because N-wise sampling involves two levels of sampling, it will be most effective for heavily executed code. Clearly, this is also where it is most important.

Concurrency Defined

Figure 8:
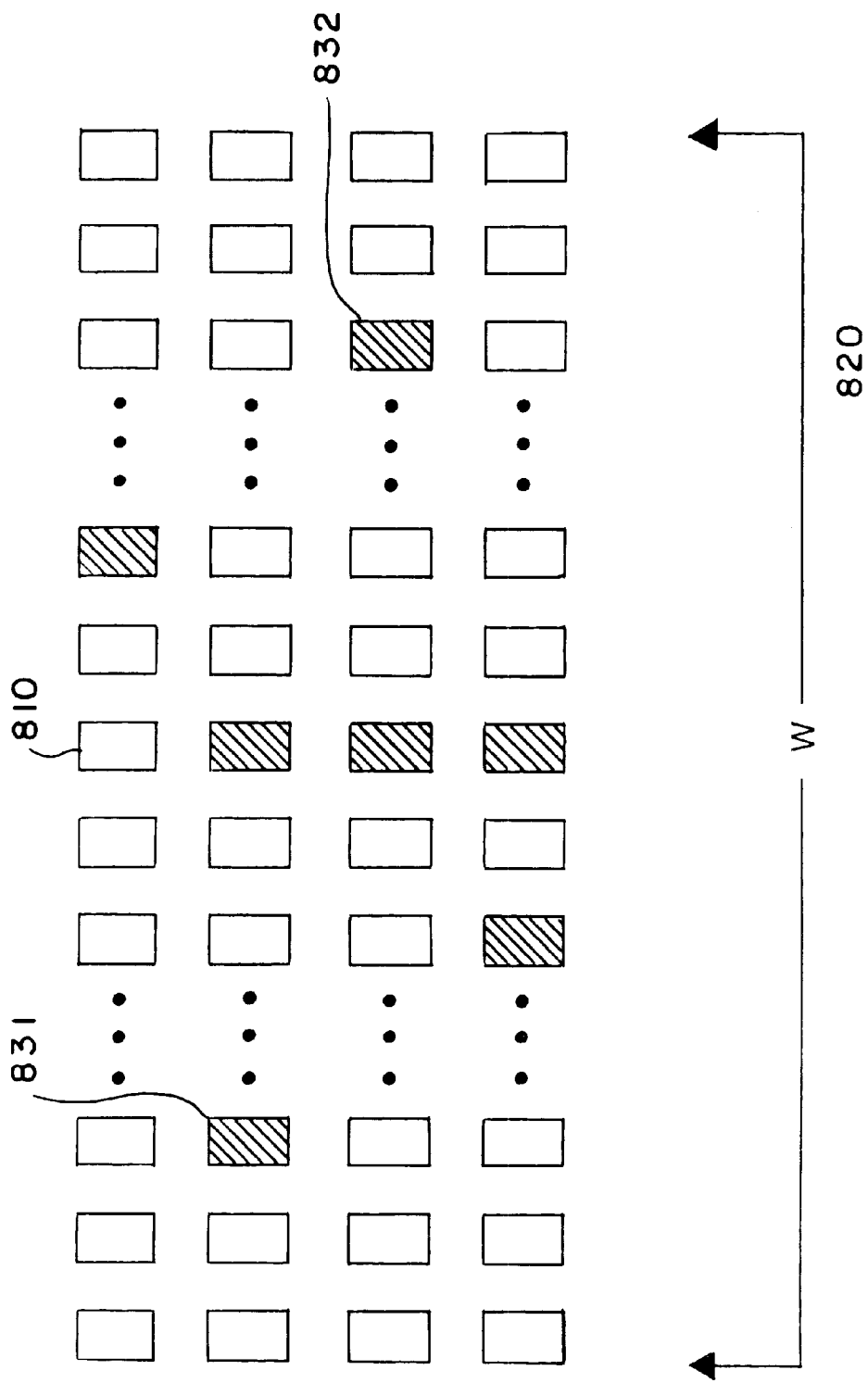
FIG. 8 is a block diagram of concurrently executing instructions.
Figure 8A:
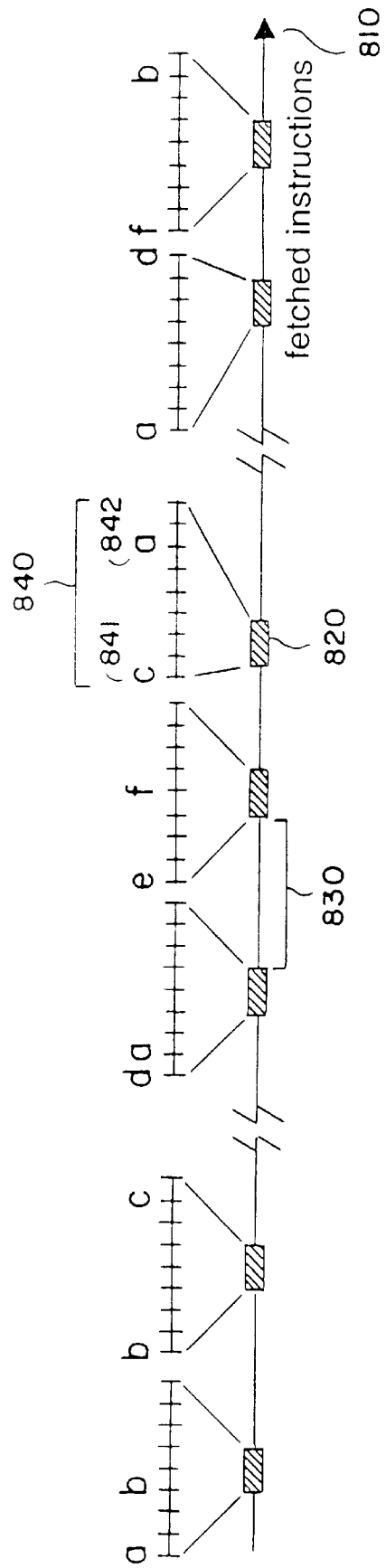
FIG. 8a is a diagram of sampling window around instructions.

As shown in FIGS. 8a–8c, for a given selected instruction I 810 in a four-wide pipeline, potentially concurrent instructions are those instructions that may be co-resident in the processor pipeline 200 with instruction I during some dynamic execution. This includes instructions that may be in various stages of execution before instruction I is fetched, as well as instructions that are fetched before instruction I is retired or aborted.

For example, the Alpha 21264 processor allows eighty in-flight instructions. In practice, however, the actual number of concurrent, i.e., in-flight, instructions is likely to be much smaller than the peak value supported by the hardware. On the other hand, a speculative execution along mispredicted or bad paths can increase the window of potential concurrency.

In order to examine concurrency on the Alpha 21264 processor, it is proposed that a reasonable size of the window W 820 around instruction I 810 should include about a hundred instructions. For other implementations, the appropriate size of the window can be determined experimentally.

Given a window of size W, e.g. about one hundred of potential concurrent instructions, unbiased sampling can be performed by randomizing the fetch distance between the selected instructions. For example, for each pair-wise sample <I1, I2>(831 and 832), the inter-sample fetch distance is set to a pseudo-random number uniformly distributed between 1 and W. Randomly varying the inter-sample distance between the first selected instruction I1 and the second selected instruction I2 in this manner captures a great deal of statistical information about which instructions actually overlap in time.

Analyzing Concurrent Overlap

Profile information for a set of concurrently selected instructions with various inter-sample fetch distances directly reveals useful concurrency statistics. Each set of corresponding sample information can be used to determine concurrency information by looking both forward in time from the first instruction I1, and backward in time from the second instruction I2.

The profile information recorded for each N-wise selected instruction should include latency data that exactly account for the instance where both instructions <I1, I2> are in the processor pipeline 200 at a given instant in time. In addition, the inter-sample fetch latency should be recorded to allow the set of latency registers to be correlated. Nested profiling can also indicate when instructions <I1, I2> are completed on abandoned execution paths. This detailed information can statistically be aggregated to produce various metrics that reflect useful concurrency levels.

Measuring Wasted Issue Slots

A collection of pair-wise instruction samples <I1, I2>, with various inter-sample fetch distances directly reveals useful concurrency statistics. Each pair-wise sample is used to compute concurrency information by looking both forward in time from the first instruction, and backward in time from the second instruction. To measure performance information for instructions fetched after an instruction I, pairs of the form <I, I2> are considered. To measure the performance of instructions fetched before instruction I consider sampled pairs of the form <I1, I>.

The profile data recorded for each pair-wise sample <I1, I2> includes values stored in latency registers 350 that indicate where I1 and I2 were in the processor pipeline 200 at each point in time, as well as the inter-sample fetch latency that allows the two sets of latency registers 350 to be correlated. The profile records also indicate whether pair <I1, I2> were retired, or not.

This detailed information can be statistically aggregated to produce various metrics that reflect useful concurrency levels. For example, one interesting measure of concurrency, with respect to an instruction I, is the average number of wasted issue slots while I was in-flight.

Figure 9:
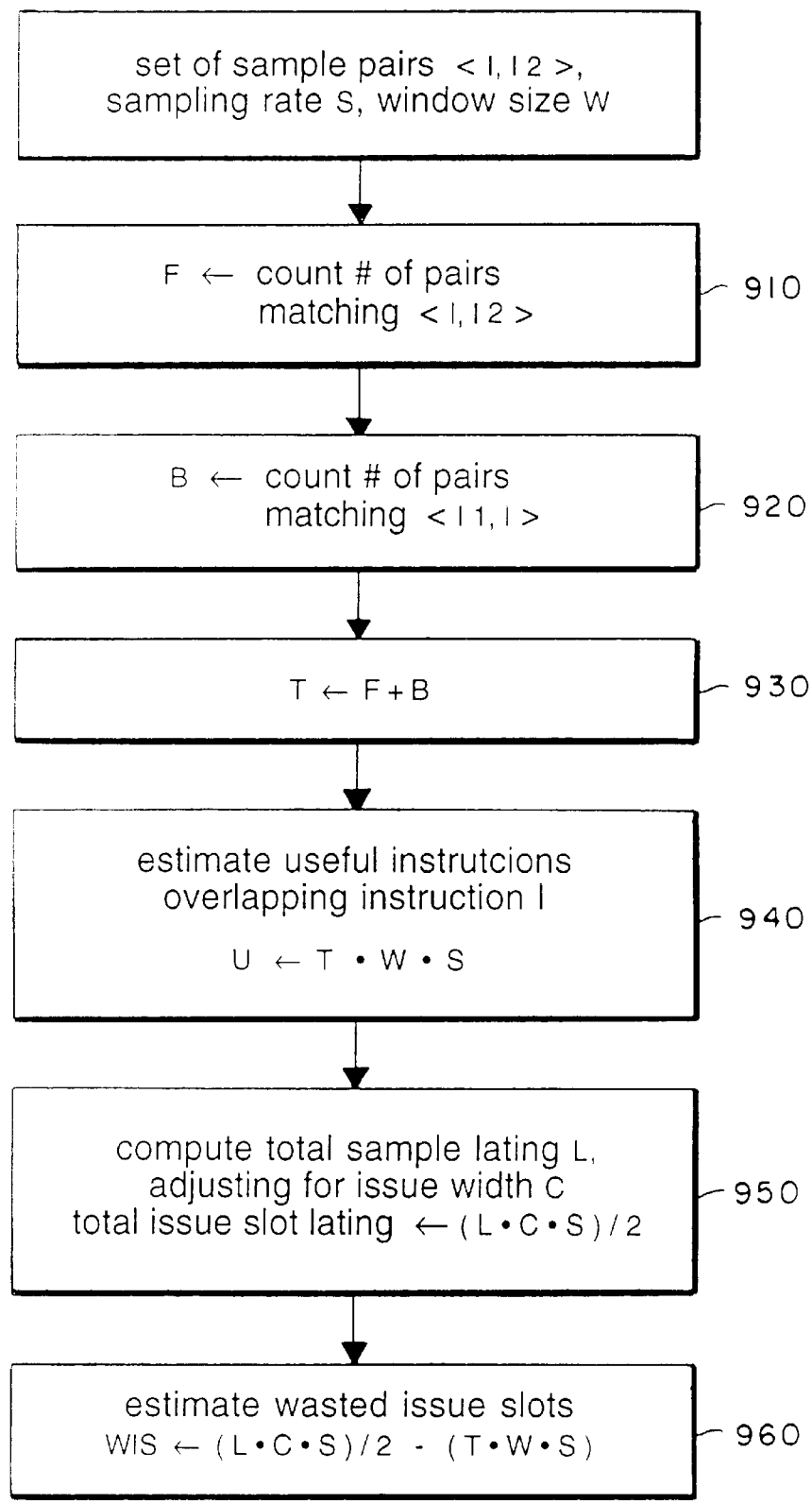
FIG. 9 is a flow diagram of a process for determining wasted issue slots.

The number of wasted issue slots can be determined as shown in FIG. 9. Let F1 be the number of samples of the form <I, I2> such that I and I2 retired and the latencies recorded with the sample indicate that the execution of I and I2 overlapped, step 910. Therefore, count the total number of sampled pairs with useful forward overlap, this is denoted by F1. Similarly in step 920, let B1 be the number of samples of the form <I1, I> such that both I and I2 retired and their executions overlapped. That is, each pair is considered twice, forward where the second instruction is sampled with respect to the first, and backward where the first instruction is sampled with respect to the second.

Then in step 930, statistically estimate the number of useful instructions that issued while instruction I was in-flight by multiplying the number of matching samples F1+B1 by the size of the sampled window of potential concurrency, W, i.e., the number of productive issue slots is W×(F1+B1).

By additionally determining the cumulative latency L1 of instruction I, measured in issue slots, e.g., four per cycle as sustainable on the Alpha 21264 processor, it is possible in step 940 to summarize the total number of wasted issue slots (WIS) during the execution of instruction I as:

$$WIS = L1 - (W \times (F1 + B1)).$$

The value WIS can easily be scaled to express the average number, or percentage of wasted issue slots per execution of instruction I. Fortunately, the values that contribute to this average can be aggregated incrementally, enabling compact storage during data collection. Also, this allows efficient data-reduction techniques, such are described in U.S. patent application Ser. No., 08/812,899 entitled "High Frequency Sampling of Processor Performance Counters" filed by Weihl et al. on Mar. 3, 1997.

Other concurrency metrics can be determined in a similar manner, such as the number of instructions that retired while instruction I was inflight, or the number of instructions that issued around I.

Finally, more detailed information can also be extracted or aggregated, such as the average utilization of a particular execution unit 240 while instruction I is in a particular pipeline stage.

Figure 10:
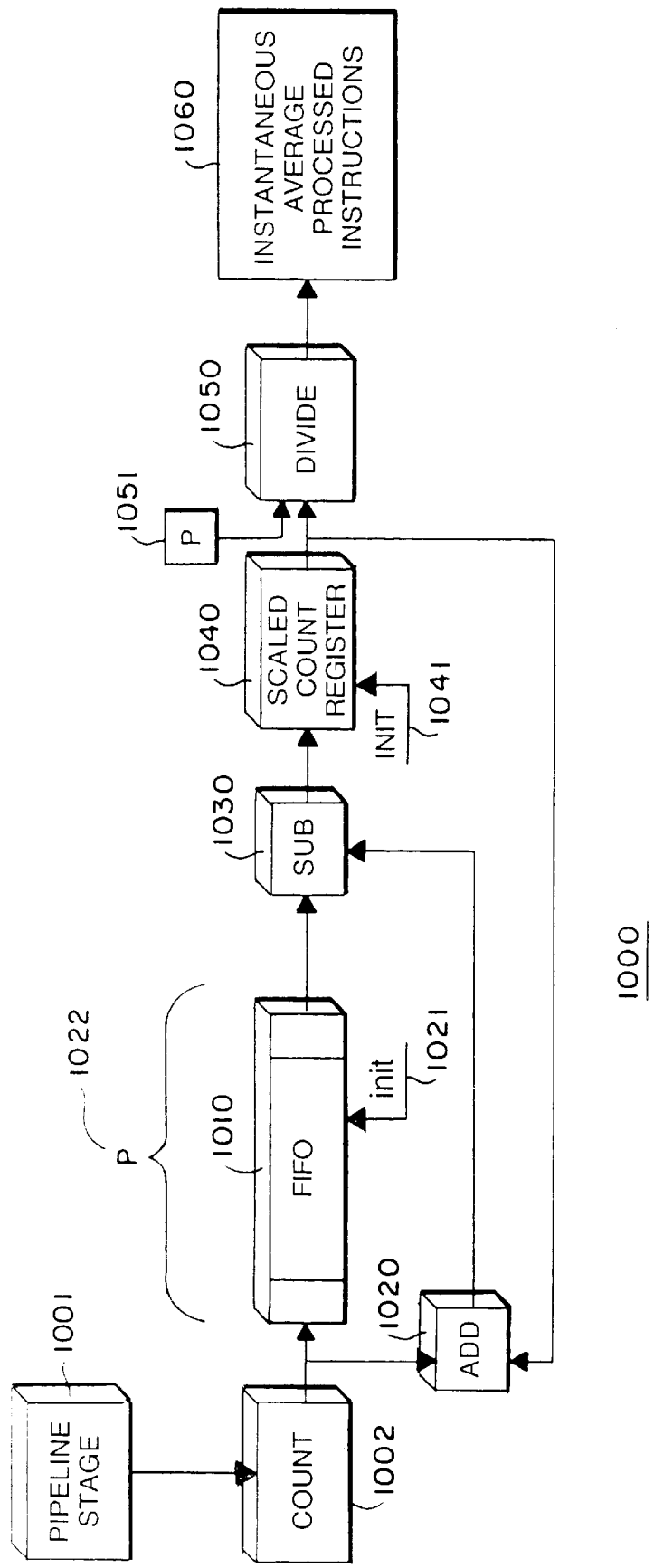
FIG. 10 is a block diagram of an apparatus to determine the average number of instructions processed during a processor cycle.

Determining the Instantaneous Average Number of Instruction Processed by a Pipeline Stage During a Single Processor Cycle A different form of multi-way sampling can also be used to determine the average number of instruction processed by the pipeline over a fixed-size number of processor cycles as shown in FIG. 10. FIG. 10 shows a circuit for determining the instantaneous average number of instructions that are, for example, retired. A similar circuit can be used to determine the average number of instructions fetched, mapped, issued, executed, i.e., for any stage 1001 of the pipeline 220, during a processor cycle.

In the apparatus 1000, a first-in-first-out (FIFO) queue 1010, and an N capacity adder 1020 each receives the number of instructions processed (count 1002) by a particular stage 1001 of the pipeline during a single processor cycle, e.g., instructions fetched, mapped, issued, executed, etc. The number of entries (P) 1022 in the FIFO queue 1010 determine the number of cycles over which the average is determined. P may be set by hardware, or by software. The value P controls the window of cycles over which the average is determined.

The adder 1010 is connected to a scaled count register 1040 so the register 1040 can accumulate the total number of instructions retired over N cycles. The FIFO queue 1020 and register 1040 can be initialized via lines 1021 and 1041. A subtractor 1030 decrements the number of instructions retired N–1 cycles in the past from the register 1040, e.g., the count stored in the head entry of the FIFO queue 1010. The output of the register 1040 is divided (1050) by the number (P) of the cycles tracked to yield the dynamic or instantaneous average number of actual instructions processed 1060 by the stage 1001. The instantaneous average may be captured in the profile registers 300, or stored in a processor register, or memory location readable by software.

When the sampled instructions are retired instructions, the actual "real" useful work done by the computer can be computed. This is a better indication than the "raw" instruction fetch rate frequently quoted to indicate relative processor performance. For example, a particular architecture may have a great fetch rate, however, stalls in the pipeline may degrade performance.

Clustering of Instructions

It is also possible to use sampled state information to identify interesting cases while aggregating concurrency information. For example, it may be useful to compute the average concurrency level when instruction I "hits" in one of the caches, and then to compare the average concurrency level with the case where instruction I suffers a cache miss. Other interesting aspects to examine for correlation with varying concurrency levels include register dependent stalls, cache miss stalls, branch-misprediction stalls, and recent branch history.

In general, N-wise sampling provides significant flexibility, allowing a variety of different metrics to be computed statistically by sampling the value of any function that can be expressed as $F(I1, I2)$ over a window of W instructions. In contrast to ad hoc prior art hardware mechanisms, the flexibility provided here makes N-wise sampling a much better choice for capturing concurrency information on complex processors. This is true because it enables designs of new metrics and analysis techniques.

Experimentation on a processor executing standard SPEC benchmark software show that metrics based on statistically collected sampling converge to values obtained with complete information at lower overhead.

Path Profiles

An additional benefit of profiling a cluster of instructions is the ability to obtain path profiles. Path profiles are useful for numerous compiler optimizations, and trace scheduling.

Furthermore, by constraining multiple points along a program's execution path together with recent branch taken history, path profiles are disambiguated. Disambiguation improves with N-wise sampling; i.e., as N increases, disambiguation improves. For heavily executed code, concurrent profiling can reveal the relative order of execution of instructions at each stage of the pipeline 200 for all executing instructions. Thus, one can now statistically reconstruct the actual operation of the execution pipeline 200 in an operational system.

Other Applications of Randomly Sampled Profile Information

The latest generation of microprocessors exploit all the tricks that computer architects allow in order to deliver the highest possible performance. These microprocessors fetch, issue, and commit multiple instructions per cycle. In addition, these processors execute instructions out-of-order. Some of them even execute memory operations out-of-order.

Unfortunately, performance characteristics can be quite variable because of the many heuristic mechanisms used by processors which issue instructions and memory operations out-of-order. As an advantage, the profiling techniques as described herein allow the system to measure a program's performance in sufficient detail so that the performance of the system 100 can automatically be improved.

Optimization

The present profiling techniques can also be used to perform optimization of the system 100. The following sections are intended to guide programmer and compiler-directed optimizations of software programs.

Hardware Optimization

Because out-of-order superscalar microprocessors reschedule instructions according to data and resource availability, compile-time instruction scheduling is much less important than it is for architecturally simpler processors. Now, major bottlenecks are due to instruction fetching and memory operations.

Specifically, cycles are lost in the processor pipeline 200 due to branch or jump mispredictions, on-chip cache misses, and TLB faults. These are difficult, if not impossible, conditions to deduce statically. Cycles are also lost to delays in higher level off-chip operations because of cache misses, resource traps, and ordering traps. Lost cycles waste time.

With conventional event counters, one can measure the aggregate number of these performance-debilitating events, but it is extremely difficult, if not impossible to attribute lost cycles to a particular instruction in the program. The profiling technique as described herein allows a user to measure major performance problems and correlate problems to the specific instructions.

Front-End Optimizations

One front-end optimization that helps performance is the re-ordering of instructions in basic-block and basic blocks in procedures. A basic block is defined as a set of instructions that are linearly executed as a unit, or not at all. Procedures generally are a cohesive set of basic blocks reached via call instructions. Procedures can include multiple basic blocks. Reordering of instructions in basic blocks and basic blocks in procedures can alter the execution flow and data accesses to optimize page and cache temporal localities, and to reduce the number of branches. Branches waste cycles since they only redirect the execution flow, and do no useful work in data. This optimization, as input, needs to know control-flow graph edge frequencies.

Trace Formation

Similarly, in order to trace instruction scheduling, a compiler needs control-flow graph edge or path frequencies. A trace scheduler might do an even better job when it has an estimate of how long it took to execute each basic block or a larger execution path. For a large scale operational system, such as the Alta Vista search engine, this is difficult to measure with traditional tools in real time.

Hot-Cold Optimization, and Path Information

Many compiler optimizations, such as trace scheduling and hot-cold optimization rely on knowing which execution paths are frequently taken through a program. These are called "hot" paths. Until recently, frequently executed paths were inferred by profiling the program, either through instrumentation or simulation, to gather basic block or edge counts, and then, using these counts, to indirectly infer the hot and cold paths.

More recently, techniques have been used to gather path information directly. Although these techniques give exact path information, they also tend to have a fairly high overhead, making them unsuitable for measuring active large scale computer systems. With the present profiling, path information can randomly be captured, at a minimal overhead, and still reflect a statistically correct view of actual execution flows.

Branch History Register

Most modern microprocessors keep track of the directions of the last N branches in a global branch history register. The branch history register, as a moving window, can be used to view recent branch predictions, and influence future instruction fetching accordingly. By capturing the contents of this register at instruction fetch time, along with the PC of the instruction being sampled, it is sometimes possible to use static analysis of the control flow graph to hypothesize the exact path through the last N branches that the processor must have taken.

However, since conventual history registers usually contain only the directions of the branches and not the actual target destinations, the information can be imprecise. In particular, merges in control flows can create ambiguities in identifying actual paths taken.

Also, asynchronous events that cause branched code to execute, such as interrupts or context switches, can pollute the branch history bits. However, these events should be relatively infrequent, and their occurrences in an operational system should be randomly distributed over the code. Because the goal is to identify high frequency paths, low frequency paths including those generated by "noisy" branch history bits generated by unpredictable asynchronous events can be ignored.

Figure 11:
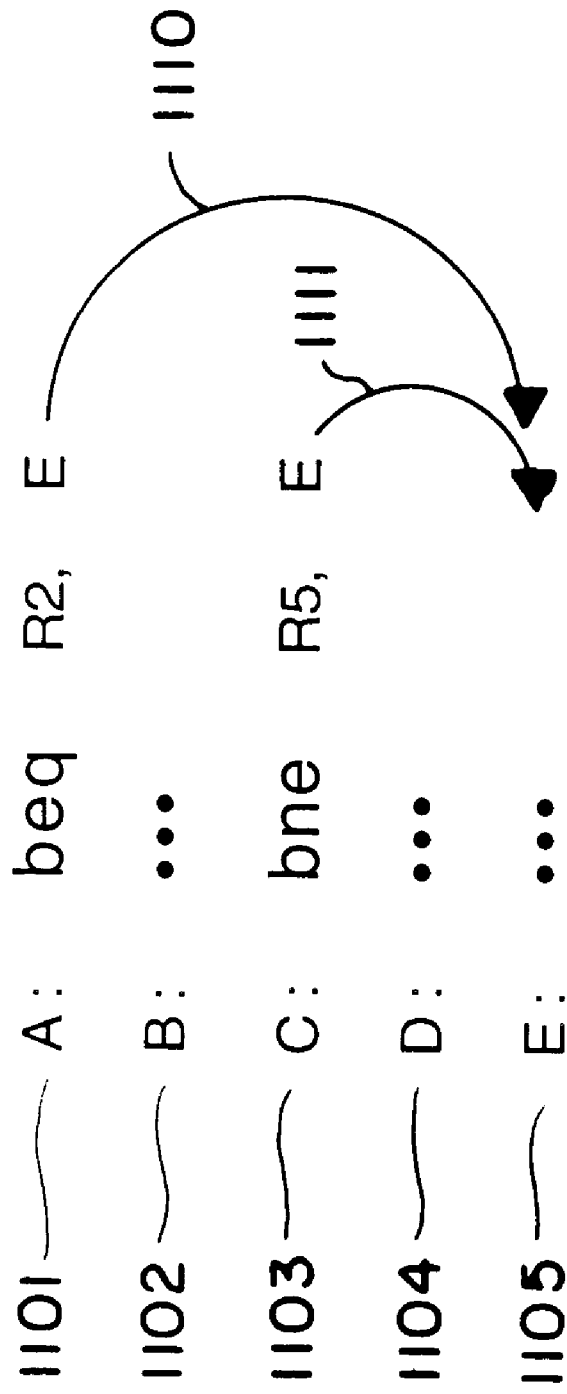
FIG. 11 is a control flow graph of a sequence of instructions.

Consider the instruction sequence shown in FIG. 11. There are instruction at PC addresses A–E (1101–1105). Instructions 1101 and 1103 at addresses A and C are branch type of instructions. If there is an instruction 1105 with a PC of E whose last bit in the global branch history is a 1, then one can rule out any paths ending in CDE, because the last branch on such paths fell through and therefore does not correspond with the global branch history. However, because of the merge of the different paths of control at point E, one is unable to determine when the true path executed was AE (1110) or ABCE 1111.

Ambiguities from Merges in Control Flow Graph

Figure 12:
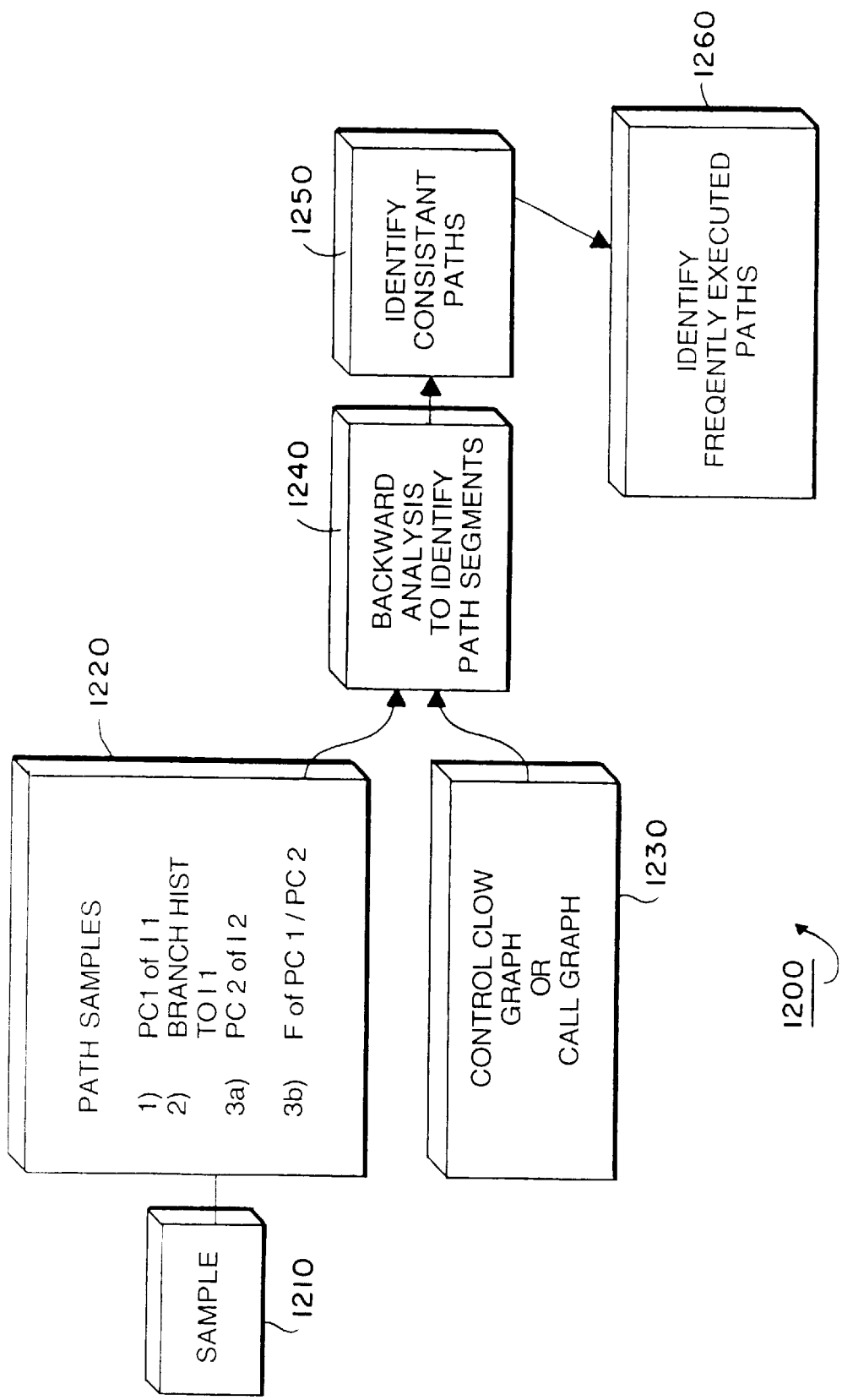
FIG. 12 is a data flow diagram of a process for identifying control flow.

FIG. 12 shows a process 1200 which can perform a static analysis of program flow using as input sampled PC values. Path samples for selected instructions are captured in step 1210 as described above. Preferably, the sampled instructions are randomly selected to minimize impact on the machine. Each "path" sample 1220 includes PC1 of a first instruction I1 sampled, and the direction taken (BRANCH HIST) by the last N conditional branches up to instruction I1.

Optionally, the sampled information can be augmented with the PC2 of a second instruction (I2) executed just prior to the first instruction, or information that is selected based on some function applied to the PC values of the last M branches, for example, a function which selects some number of low order bits, or the bits are determined using a hash function.

In step 1240, the path samples are used to perform a backward analysis of a control flow graph of the program. The analysis can identify execution paths that are consistent (1250) with the information data, and this information can be aggregated to identify frequently executed paths (1260) which will benefit more from optimization.

For example, with reference to FIG. 11, at instruction E, given a branch history length of 1 and with history bits "1," the software tool can identify the path segments AE 1110, and ABCE (1101–1105) as possible paths. The best possible outcome exists when the static analysis is able to identify only a single path segment as a possibility given the values of the branch history bits.

Other information about recent execution history of the process can also aid in identifying the execution path that has been taken to get to a particular instruction. One piece of information that is useful is the knowledge of a second PC value of an instruction that was recently executed. By using multiple PC values, perhaps with N-wise sampling, paths including only one PC can be eliminated.

Sampling Last M Instructions of a Given Class

Figure 13:
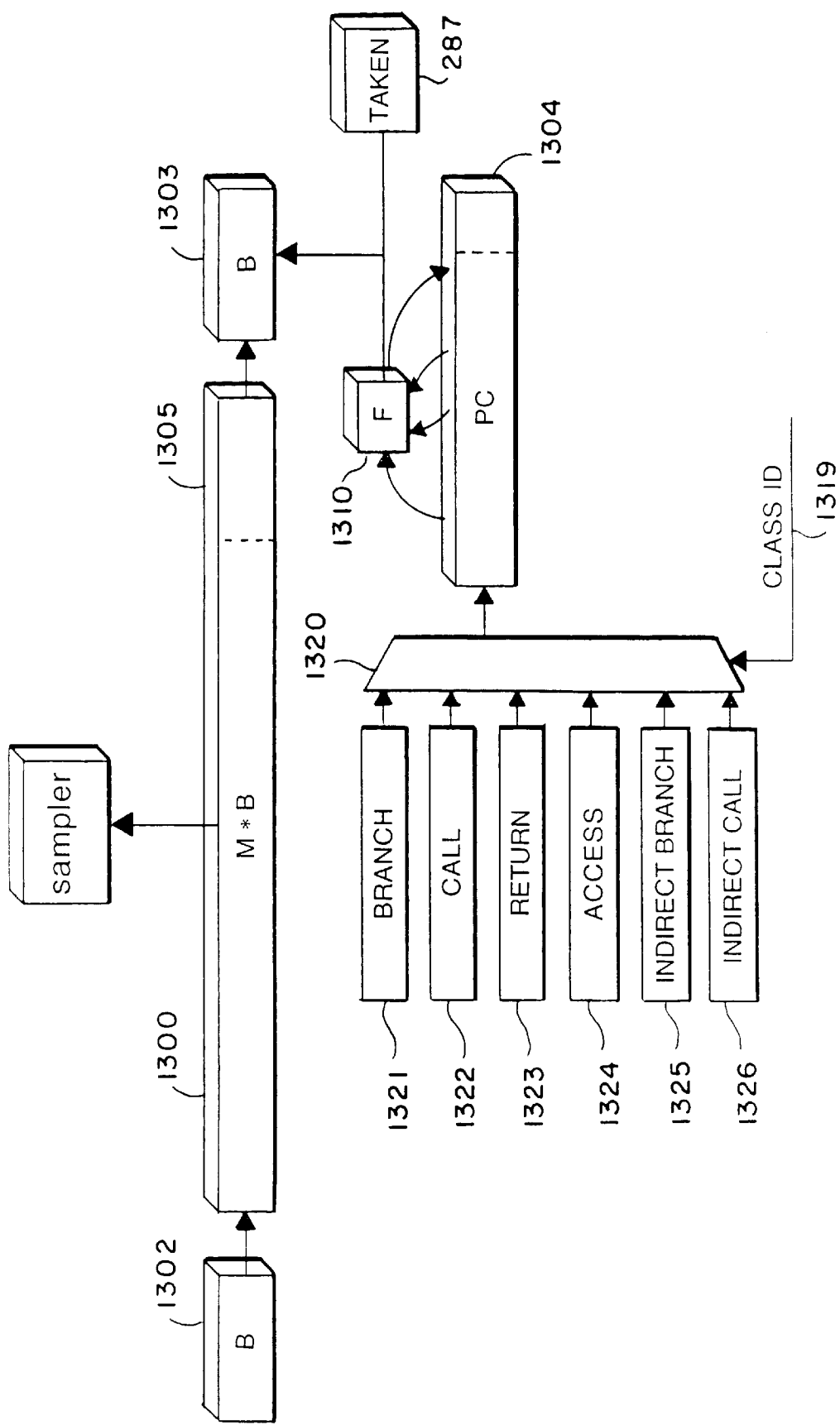
FIG. 13 is a block diagram of an apparatus for collecting branch history.

In another technique as shown in FIG. 13, the hardware can capture a small number of bits (B) from each of the last M instructions processed in any chosen stage of the pipeline, for example, the retire unit. The B bits 1303 can be the low order B bits of the PC, or B bits can be elected using a hardware implemented function F 1310 applied to the PC 1304, i.e., is B←F(PC). If the function 1310 is a hashing function, non-uniform distributions of branch addresses are avoided.

The classes of instruction can be identified as, for example, conditional branch, call, return, access (load or store) instructions, indirect branch, and indirect call 1321–1326. The class can be selected by a selection mechanism 1320 such as a comparator or multiplexer via line 1321. The class can also be identified by the stage of the pipeline, for example, fetch, map, or retire, etc. The class ID 1319 may be controlled by software.

The selected bits can be stored in a shift register 1300 that is M by B bits wide. This register is accessible to PSW 520 of FIG. 5 as an internal register of the software, or as a memory location. Whenever an instruction 1321–3124 of the identified class is processed, the register 1300 is shifted to discard the high order B bits 1302 in the shift register 1300. The selected B bits 1303 of the PC 1304 of the instruction are shifted into the vacated bits 1305. Thus, the register 1300 servers as a fingerprint or "path signature" for those types of instructions. The register 1300 can help narrow down, for example, the most recent M branches that were taken, because a path that does not match on a current path signature can be eliminated from consideration. For branch instructions 1321, the branch taken indication 287, see FIG. 2, cam be used to trigger sampling.

The accuracy improvement gained by path signatures can be substantial, and even saving just four bits from the last six branches, e.g., B=4, M=6, doubles the accuracy in determining execution paths for the standard SpecInt95 benchmark program.

Using the path signature and the global branch history, the trace can be analyzed as follows.

For each instruction executed in the trace, work backwards to determine path segments until either:

a) the global branch history bits are exhausted, or (b) the beginning of the routine containing the instruction is reached.

Note, when a call instruction of a procedure is encountered during the backwards walk of the control flow graph, one works backwards through the called procedure and eventually returns to the calling procedure when there is sufficient branch history to work backwards through the entire called routine. Thus, giving a more precise view of the execution flow.

Cache & TLB Hit Rate Enhancement

High miss rates in caches or translation look-aside buffers (TLBs) can significantly degrade the performance of the system. Prior art approaches have generally relied on either specialized hardware, or specialized software schemes for gathering cache miss addresses, such as periodically flushing the TLB. The observed miss patterns give an approximate understanding of the frequently accessed or "hot" pages which can be used to influence virtual-to-physical page mapping policies. However, address information necessary to do a complete analysis may not be available by the time the event is detected.

Figure 14A:
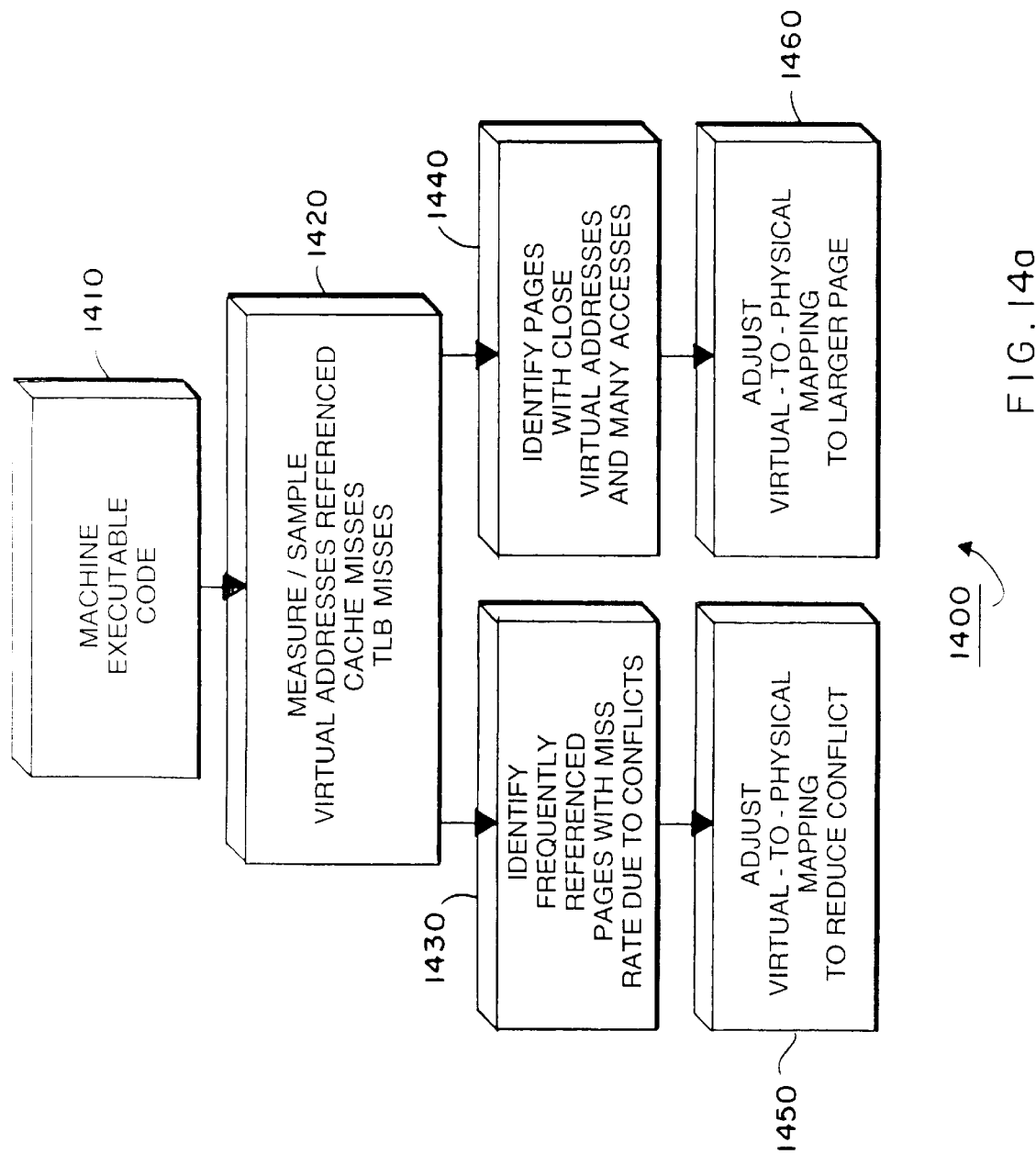
FIG. 14a is a flow diagram of a page mapping process.

FIG. 14 shows a process 1400 which can be used to perform a more precise virtual-to-physical page mapping. Code to be mapped is executed in the system in step 1410. In step 1420, operations which access memory (loads and stores) are selected for sampling. Preferably, the sampling is random to minimize overhead.

While the instructions are executing, the effective virtual memory addresses are identified, as well as any cache and TLB misses, step 1430, thus as an advantage, the events and addresses can directly be attributed to specific instructions. Similarly, it is possible to identify adjacent pages with high access rates in step 1440. In step 1450, the virtual-to-physical page mapping can be adjusted to reduce access conflicts in the caches and TLBs. In step 1460, the adjacent pages can be combined into larger "superpages" to reduce paging overhead.

The virtual addresses of memory references that miss in the cache or TLB as captured here can be directly attributed to specific instructions to provide exactly the type of information needed to guide page mapping policies. Using information about the application's memory reference stream to dynamically control the operating system's virtual-to-physical mapping policies can successfully avoid conflicting misses in large direct-mapped caches, lower TLB miss rates through the creation of superpages, and decrease the number of remote memory references in non-uniform memory access times (NUMA) multiprocessors through replication and migration of pages.

Improved Instruction Scheduling

One important task performed during code optimization is ideal instruction scheduling. Ideal instruction scheduling reorders code to minimize delays due to memory latencies. Although static ordering of neighboring instructions in a basic block is less important than it was for the previous generation of in-order RISC processors, macroscopic instruction scheduling is much more important in out-of-order processors.

One very difficult aspect of instruction scheduling is the scheduling of loads and stores. This is true because static schedulers do not always have exact dependency information which would allow them to optimally schedule the memory access instructions. In addition, it is difficult to exactly predict the latency of memory access instructions. Since instruction schedulers usually lack precise information about memory accesses, they generally schedule loads and stores assuming D-cache hits. As an alternative, balanced scheduling tries to generate a schedule that includes an equal amount of latency per load. This is an improvement over always assuming that load/store operations will always hit in the cache.

Scheduling of Threads in a Multithreaded Processor

In a multithreaded processor, information about resource utilizations of threads obtained using the profiling methods described above can be used to schedule threads so as to maximize overall resource utilization and throughput.

If two threads have complementary resource usages, for example, one thread primarily uses integer arithmetic units while the other thread primarily uses floating-point arithmetic units, then the two threads can be scheduled to run at the same time, since they will use different functional execution units. Similarly, if two threads have conflicting resource usages, for example, both threads make heavy use of floating-point arithmetic unit), then they can be scheduled to run at different times.

Figure 14B:
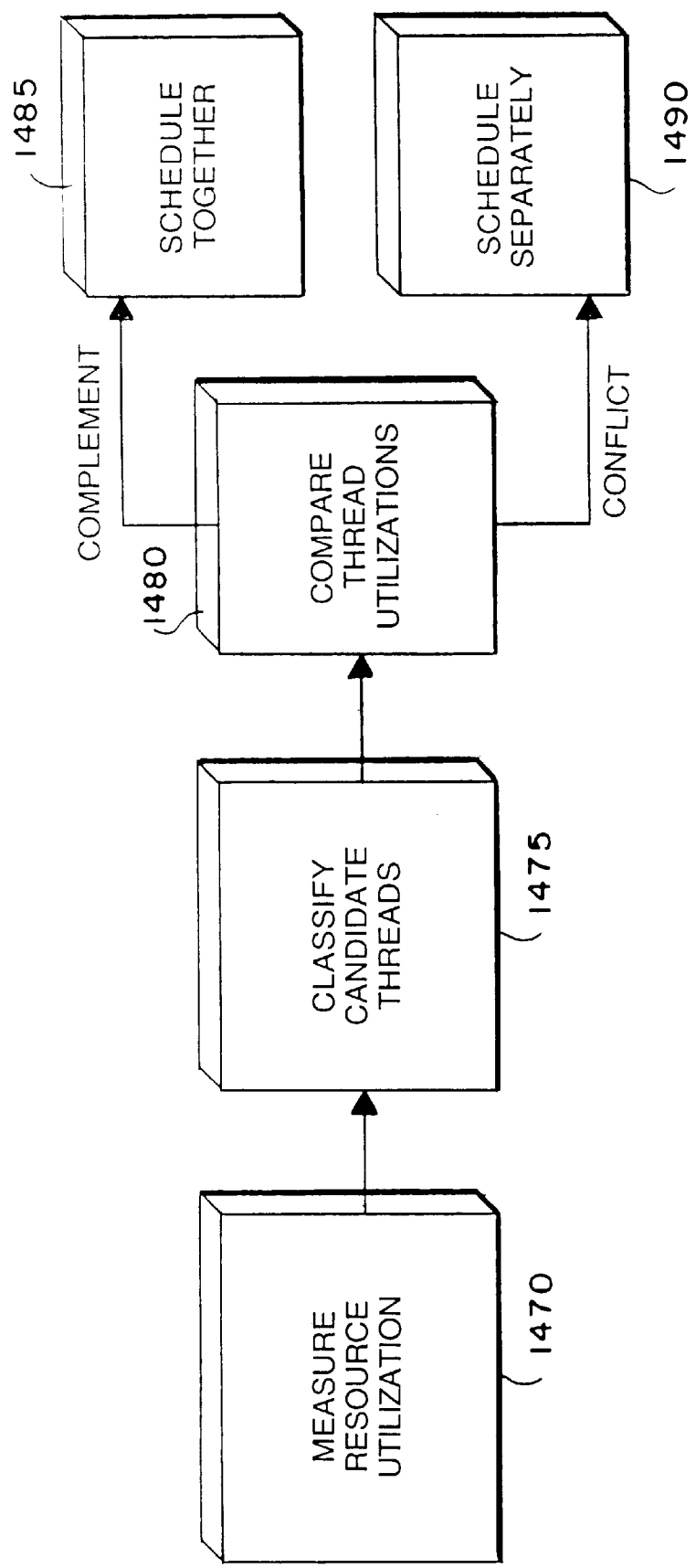
FIG. 14b is a flow diagram of a thread scheduling process.

FIG. 14*b* shows a process for scheduling threads according to processor utilization. Resource utilizations of threads executing in an operational system are measured in step 1470. In step 1475, the utilizations of the resources are aggregated, and threads are classified into sets according to their resource utilizations. With the present sampling, it is possible to determine how each thread uses each class of resources in the processor, for example, integer arithmetic units, floating-point arithmetic units, memory units, branch units, issue units, etc.

In step 1480, the resource utilization of threads are compared to determine an non-conflicting execution schedule. If the combined usage of a set of threads for a given class of resources would result in the class of resources being significantly more than fully utilized, then set of threads should not be scheduled together step 1490; conversely, if their combined usage would result in the class of resources being less than fully utilized or only slightly more than fully utilized, then they can profitably be scheduled together step 1485.

Figure 15:
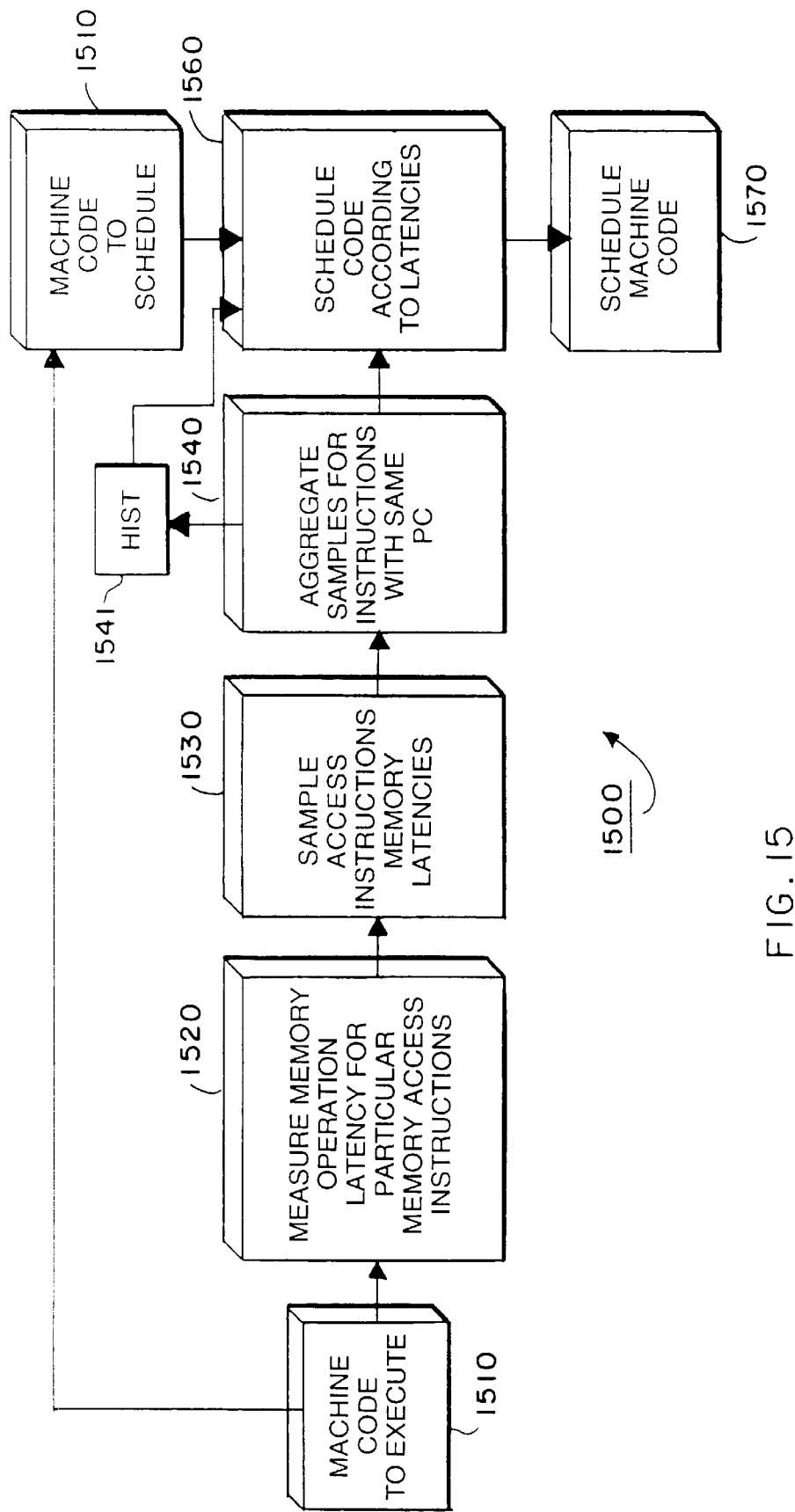
FIG. 15 is a flow diagram of memory latency influenced instruction scheduler.

FIG. 15 shows a process 1500 that can be used to perform instruction scheduling. Machine code 1510 is executed on the system 100 of FIG. 1. While the code is executing, latencies of memory operation instructions are measured in step 1520 as described above. The measurements for multiple, e.g., pairs, of instructions can be sampled in step 1530. Sampling can be done randomly to reduce overhead. The sampled data for instructions with the same PC are aggregated in step 1540 to develop, for example, a histogram (HIST) 1541 of latencies. In step 1560, the machine code is reordered. The reordering is according to the aggregated histogram information 1541. For example, memory operations with long latencies are advanced as far away as possible from operations which depend on them. For example, memory operations with long latencies are advanced as far away as possible from operations which depend on them. Step 1560 can use a scheduling algorithm such as list scheduling or trace scheduling.

If one gathers load and store latencies via random sampling, then one can schedule each instruction according to its histogram of latencies. The present technique can be used to drive optimizations by collecting latency information without incurring the expense of a full cache simulation.

Inserting Prefetch Instructions

Figure 16:
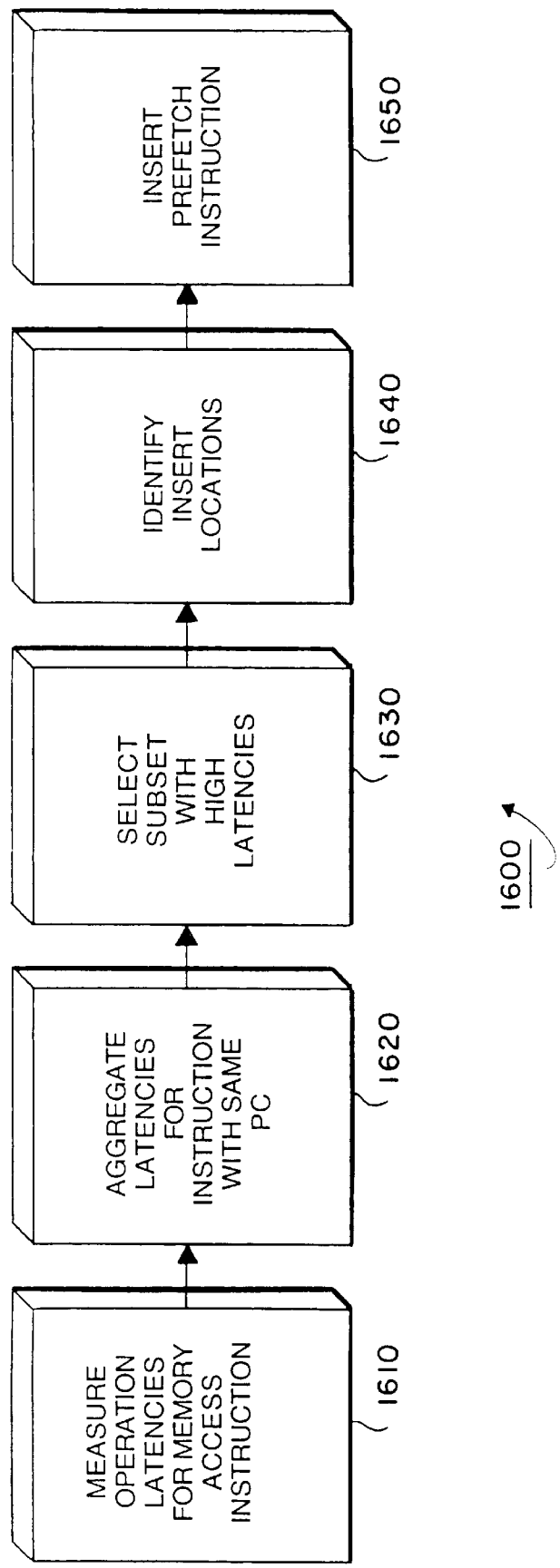
FIG. 16 is a flow diagram of a process 1600 for inserting prefetch instructions.
Figure 8A:
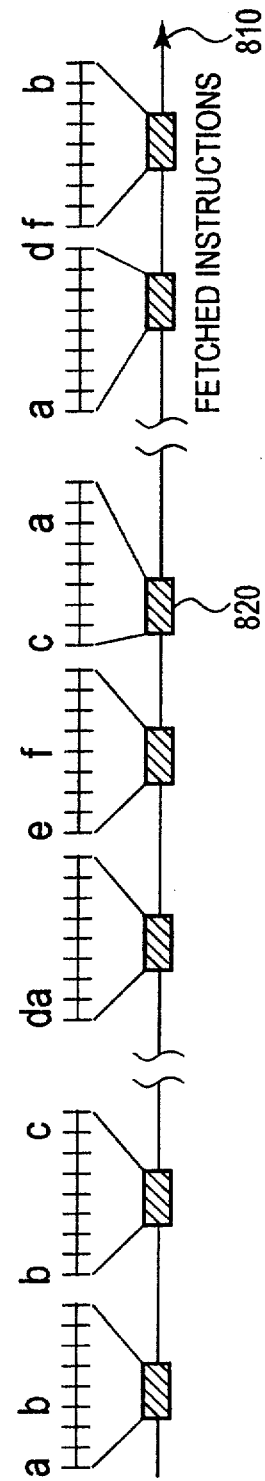

FIG. 16 shows a process for inserting prefetch instructions based on measured latencies. The insertion of prefetches is one technique that can help to hide processor stalls that arise from waiting for data to be returned from memory. By issuing a request to the memory system well in advance of the actual need for the data, and sometimes requesting the data even before it can be determined that the data will even be needed, compilers and optimizers can often hide most or all of the latency to fetch data from memory.

However, in order to actually improve performance, it is desirable to only insert prefetches for those memory operations that are actually experiencing significant latency, that is, inserting prefetches for memory operations that are not actually incurring long latencies can actually slow down the program due to the cost of executing the additional prefetch instructions. In order to identify memory operations, and in particular load operations, that would benefit from prefetching, it is desirable to collect statistical data about the average latency experienced by the various memory operations in a program.

The general scheme for this is illustrated in FIG. 16. Step 1610, measure memory operation latencies for memory operations in program. Step 1620, aggregate the sampled memory operation information for instructions with the same program counter (PC) value. Identify a subset of memory operations with high memory latencies for which prefetches should be inserted, step 1630.

In step 1640, identify profitable locations for insertion of prefetches for these memory operations, based on execution frequency information and measured latency information. Step 1650, insert prefetches in the appropriate locations.

Latencies can be measured as described above. One way is to have the sampling hardware directly measure the latency of memory operations. Another way is by using paired sampling and looking for pairs where a load instruction is the first sample in the pair and where a use of the data from the load is the second sample in the pair. By looking at the latency information in the two samples, and in particular the difference between the issue times of the two samples, it is possible to estimate memory system latency for the load operation.

The foregoing description has been directed to specific embodiments. It will be apparent to those skilled in the art that modifications may be made to the described embodiments, with the attainment of all or some of the advantages. Therefore, it is the object of the appended claims to cover all such variations and modifications as come within the spirit and scope of the invention.

We claim:

1. A method for inserting memory prefetch operations in a program executing in a computer system including a processor and a memory, comprising the steps of:

measuring latencies of instructions of the program; and automatically inserting memory prefetch instructions in the program based on the measured latencies to optimize execution of the program.

2. The method of claim 1 wherein the latencies measure the time from when a load instruction issues a request for data to the memory until the data are available in the processor.

3. The method of claim 1 wherein a program optimizer uses the measured latencies to estimate the number of cycles that elapse before data of a memory operation are available.

4. The method of claim 2 wherein the program optimizer inserts memory prefetch instructions in the program for selected memory operations.

5. The method of claim 1 wherein states of the processor are randomly sampled by hardware to measure the latencies.

6. The method of claim 1 wherein pairs of selected instructions are sampled by hardware to measure the latencies.

7. The method of claim 6 wherein pairs of selected instructions include a related memory fetch instruction, and an instruction that uses data fetched by the related memory fetch instruction.

* * * * *

UNITED STATES PATENT AND TRADEMARK OFFICE
CERTIFICATE OF CORRECTION

Page 1 of 3

PATENT NO. : 5,964,867
DATED : October 12, 1999
INVENTOR(S) : Anderson, et al

It is certified that error appears in the above-identified patent and that said Letters Patent is hereby corrected as shown below:

Renumber Drawing Sheets 1-21 to 1-22.

Fig. 8a should be corrected to read as shown on the attached page.

Add Sheet 13 of 22 consisting of Figs. 8b and 8c, as shown on the attached page.

Signed and Sealed this

First Day of August, 2000

Attest:

Q. TODD DICKINSON

*Attesting Officer*  *Director of Patents and Trademarks*

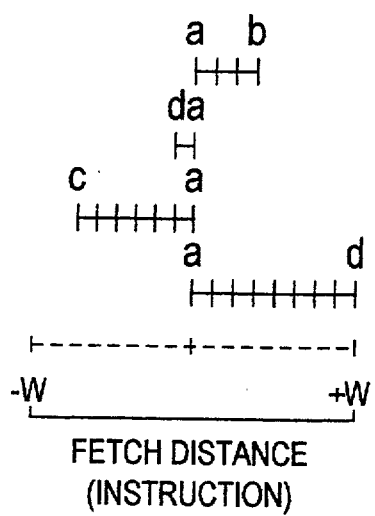
FIG. 8b — FETCH DISTANCE (INSTRUCTION)
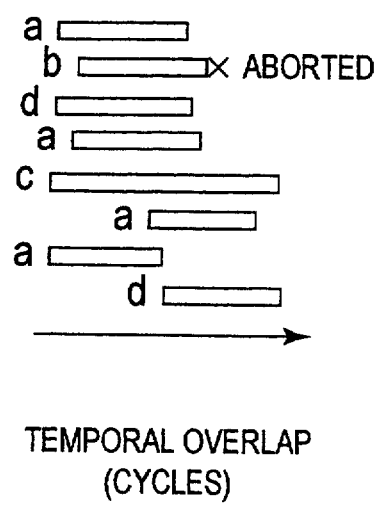
FIG. 8c — TEMPORAL OVERLAP (CYCLES)